(12) United States Patent
Lee et al.

(10) Patent No.: US 8,781,470 B2
(45) Date of Patent: Jul. 15, 2014

(54) MOBILE COMMUNICATIONS SYSTEM AND METHOD FOR TRANSMITTING DATA WHEN HANDOVER OCCURS

(75) Inventors: Jinsock Lee, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1694 days.

(21) Appl. No.: 11/808,301

(22) Filed: Jun. 8, 2007

(65) Prior Publication Data

US 2007/0293226 A1 Dec. 20, 2007

(30) Foreign Application Priority Data

Jun. 14, 2006 (JP) ................................. 2006-165356

(51) Int. Cl.
*H04W 36/00* (2009.01)

(52) U.S. Cl.
USPC ........... 455/436; 455/560; 455/561; 455/524; 455/525; 455/522; 370/331; 370/352; 370/238; 370/248; 370/412

(58) Field of Classification Search
USPC ................. 455/436, 450, 560–561, 428–429, 455/524–525; 370/32–331, 418–429, 352, 370/412
See application file for complete search history.

(56) References Cited

U.S. PATENT DOCUMENTS

| | | | |
|---|---|---|---|
| 6,928,304 B2 * | 8/2005 | Wigell et al. .................. 455/561 |
| 7,554,951 B2 * | 6/2009 | Park et al. ..................... 370/331 |
| 7,653,026 B2 | 1/2010 | Obuchi et al. | |
| 7,885,652 B2 | 2/2011 | Umesh et al. | |
| 2004/0088641 A1 * | 5/2004 | Torsner et al. ................. 714/776 |
| 2004/0147286 A1 * | 7/2004 | Kim et al. ...................... 455/560 |
| 2004/0248606 A1 | 12/2004 | Suzuki et al. | |
| 2005/0208945 A1 * | 9/2005 | Hong et al. .................... 455/436 |
| 2006/0146753 A1 * | 7/2006 | Park et al. ...................... 370/331 |
| 2008/0051086 A2 * | 2/2008 | Etemad et al. ................. 455/436 |
| 2008/0081651 A1 | 4/2008 | Kuroda et al. | |

FOREIGN PATENT DOCUMENTS

| | | |
|---|---|---|
| EP | 1519519 A1 | 3/2005 |
| EP | 1545143 B1 | 6/2011 |
| JP | 2004-32640 A | 1/2004 |
| JP | 2006-174273 A | 6/2006 |
| JP | 2006-295912 A | 10/2006 |
| WO | WO 01/05121 A1 | 1/2001 |
| WO | WO 2004/030396 A1 | 4/2004 |
| WO | WO 2006/016457 A1 | 2/2006 |

OTHER PUBLICATIONS

3GPP TR 25.813 VO.9.2.2 (May 2006) 9.1.7 (Network aspects), 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7).

\* cited by examiner

*Primary Examiner* — Michael T Vu
(74) *Attorney, Agent, or Firm* — Foley & Lardner LLP

(57) ABSTRACT

Upon handover, the data incompletely received by a source base station is retransmitted by a mobile station to a target base station, and then reversely transferred from the target base station to the source base station. By virtue of this reverse transfer control, the need to transfer all the received data from the source base station to the target base station upon handover can be eliminated, whereby it is possible to reduce the amount of traffic between the base stations. Moreover, ARQ processes are set respectively between the mobile station and the source base station and between the mobile station and the target base station, whereby it is possible for the mobile station to transmit new uplink data to the target base station, in parallel with the ARQ process with the source base station under the reverse transfer control.

4 Claims, 25 Drawing Sheets

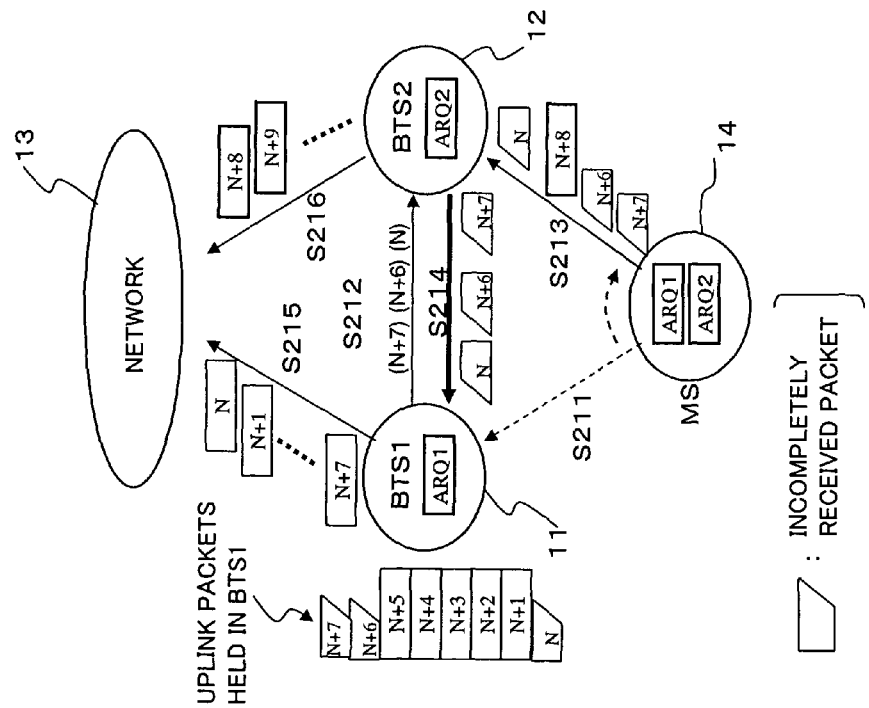
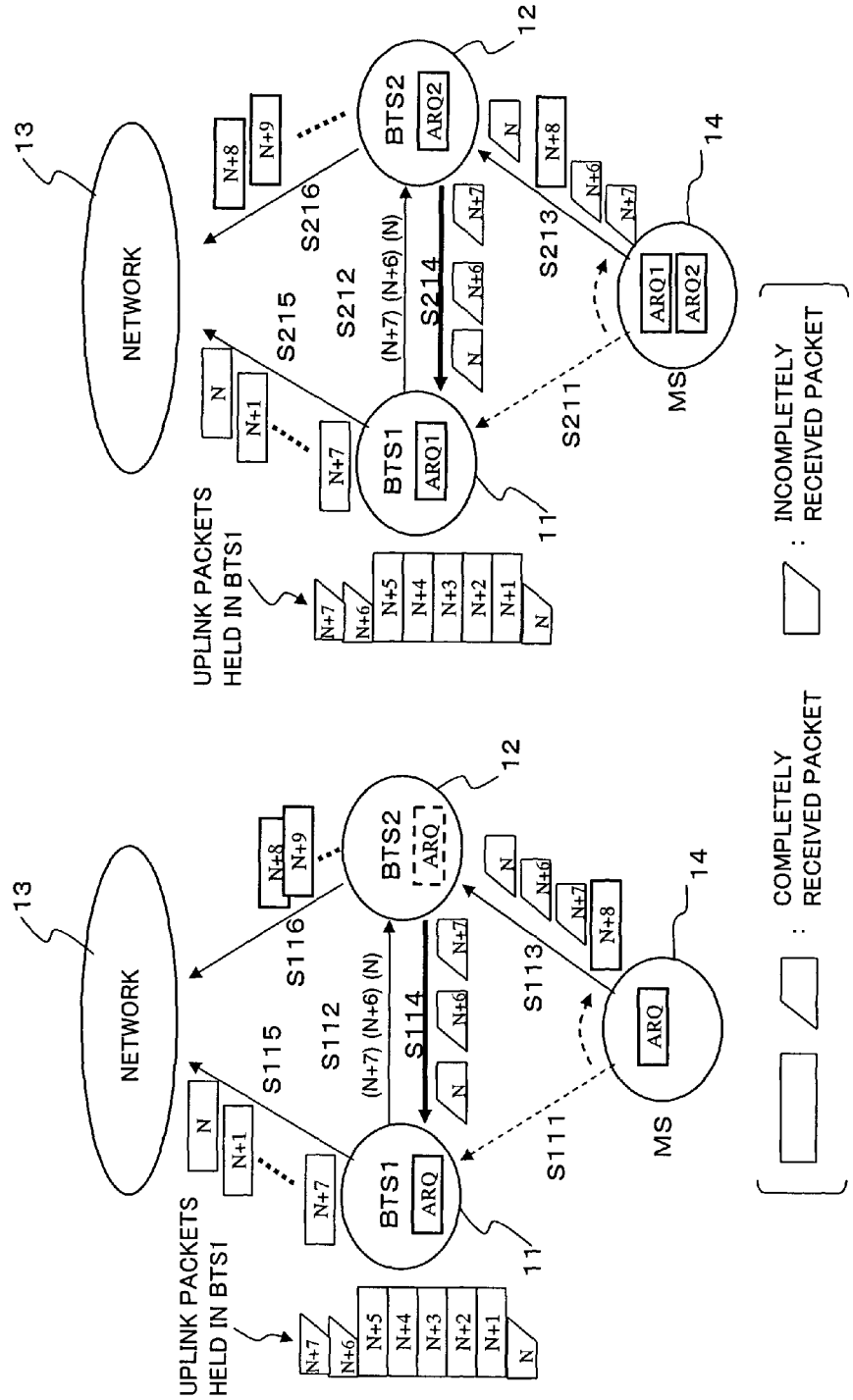

SECOND NETWORK ARCHITECTURE

FIRST NETWORK ARCHITECTURE

EXAMPLE 1

EXAMPLE 2

FIG. 13 EXAMPLE 3

PROCESS A IN EXAMPLE 3

EXAMPLE 4

EXAMPLE 5

MOBILE COMMUNICATIONS SYSTEM AND METHOD FOR TRANSMITTING DATA WHEN HANDOVER OCCURS

BACKGROUND OF THE INVENTION

1. Field of the Invention

This application is based upon and claims the benefit of priority from Japanese Patent Application No. 2006-165356, filed on Jun. 14, 2006, the disclosure of which is incorporated herein in its entirety by reference.

The present invention relates to a mobile communications system and, more particularly, to a method and system for transmitting data at the time of handover.

2. Description of the Related Art

In a mobile communications system or the like employing packet transmission protocols, for example, high-speed packet transmission protocols such as HSDPA (High Speed Downlink Packet Access) and EUDCH (Enhanced Uplink Dedicated Channel)/HSUPA (High Speed Uplink Packet Access), the prevention of data loss and service interruption at the time of handover (hereinafter, abbreviated as "HO" where appropriate) has become more and more important. In particular, as the automatic repeat request (ARQ) function of the radio link control (RLC) layer is shifted from a radio network controller (RNC) to a base station (Node B), it is a significant problem to be solved how lossless handover is effectively realized in the uplink data transmission from a mobile station to a base station.

One of the basic handover procedures in the uplink data transmission is described in 3GPP TR 25.813 V0.9.2 (2006-05), 9.1.7 (Network aspects) ($3^{rd}$ Generation Partnership Project; Technical Specification Radio Access Network; Evolved Universal Terrestrial Radio Access (E-UTRA) and Evolved Universal Terrestrial Radio Access Network (E-UTRAN); Radio interface protocol aspects (Release7)). The outline of a handover between base stations based on this procedure is as follows. A handover source base station (source eNB) forwards uplink packets that have been successfully (or completely) received from a user equipment/mobile station (UE), to a gateway (GW), discards packets that have not been completely received, and reports reception status information to the user equipment. During this period of time, if the user equipment's data destination is changed to the cell of a handover target base station (target eNB), the user equipment retransmits to the target base station the uplink packets that have been reported as being incompletely received. The target base station then forwards the completely received uplink packets to the gateway.

In this manner, even if a handover between the base stations occurs while uplink data is being transmitted, all the uplink data packets transmitted from the user equipment are forwarded to the gateway through any one of the source base station and target base station. According to this procedure, the user equipment can forward all uplink packets to the gateway, without transferring uplink packet and information such as an ARQ context from the source base station to the target base station.

However, in the case where the transmission of packets from a base station to a gateway is performed in order of the sequence numbers of the packets, when a packet is incompletely received, the packets with the sequence numbers subsequent to this incompletely received packet (even if they are completely received) are held by the base station. Then, after the packet corresponding to the incompletely received packet is completely received from a mobile station through the ARQ procedure, this completely received packet and the subsequent completely received packets are transmitted to the gateway.

Therefore, if a handover between base stations occurs in a state where one of the base stations holds untransmitted uplink packets, it is a significant matter how to handle these untransmitted uplink packets. A conceivable solving means is a method in which the source base station transfers these untransmitted uplink packets and ARQ context to the target base station, and when the target base station has completely received a retransmitted packet from the mobile station, the target base station transmits the packets including the retransmitted packet and subsequent uplink packets to the gateway.

However, according to the above-mentioned method, even when synchronization has been established between the mobile station and the target base station, the mobile station is left in a state of substantially no data transmission until the source base station transfers all the untransmitted uplink packets to the target base station and the target base station completely receives the retransmitted packet and then starts to transmit the uplink packets. During this period of time, the communication stays interrupted.

Moreover, the narrower the bandwidth of an interface between the base stations, the longer time it takes to transfer the packets between the base stations, and hence the longer duration of a communication interruption. The duration of a communication interruption is a factor directly related to the quality of radio service, particularly greatly affecting the user's feeling about usability. To reduce this duration of a communication interruption, the data transfer between the base stations needs to be carried out at as high speed as possible. However, it is undesirable to increase the transfer rate by widening the bandwidth of the interface between the base stations only for this purpose, also from the viewpoint of the effective use of network resources. Radio carriers may also be burdened with higher costs.

Furthermore, according to the method in which the untransmitted uplink packets and ARQ context are transferred from the source base station to the target base station upon the occurrence of a handover (hereinafter, this method will be referred to as forward transfer method), the ARQ process with the source base station is simply cleared when a handover occurs. Therefore, although this method can be applied to, for example, a system architecture in which the source base station and target base station are both physically connected to a gateway, it is difficult to flexibly adapt this method to other system architectures.

SUMMARY OF THE INVENTION

Accordingly, an object of the present invention is to provide a novel data transmission method and system that can reduce the amount of data transferred between base stations.

According to the present invention, a method for transmitting data when handover occurs from a first base station to a second base station in a mobile communications system, includes: a) retransmitting a data unit among data that the first base station has received from a mobile station, from the mobile station to the second base station, wherein retransmission of the data unit is required according to retransmission control in the first base station; and b) reversely transmitting the data unit from the second base station to the first base station.

According to the present invention, data corresponding to incompletely received data at a source base station is retransmitted by the mobile station to a target base station and then the retransmitted data received by the target base station is reversely transmitted to the source base station. Such a reverse transfer control eliminates the need of transferring all received data at the time of handover from the source base station to the target base station, resulting in the reduced amount of traffic between base stations and a reduction in the duration of a communication interruption.

BRIEF DESCRIPTION OF THE DRAWINGS

FIG. 1A is a schematic diagram of a mobile communications system schematically showing a method for transferring data at the time of handover according to a first exemplary embodiment of the present invention.

FIG. 1B is a schematic diagram of a mobile communications system schematically showing a method for transferring data at the time of handover according to a second exemplary embodiment of the present invention.

FIG. 3A is involved in a fourth exemplary embodiment of the present invention, and FIGS. 3A and 3B are involved in a fifth exemplary embodiment of the present invention.

DETAILED DESCRIPTION OF THE PREFERRED EMBODIMENTS

1. First Exemplary Embodiment

Figure 2B:
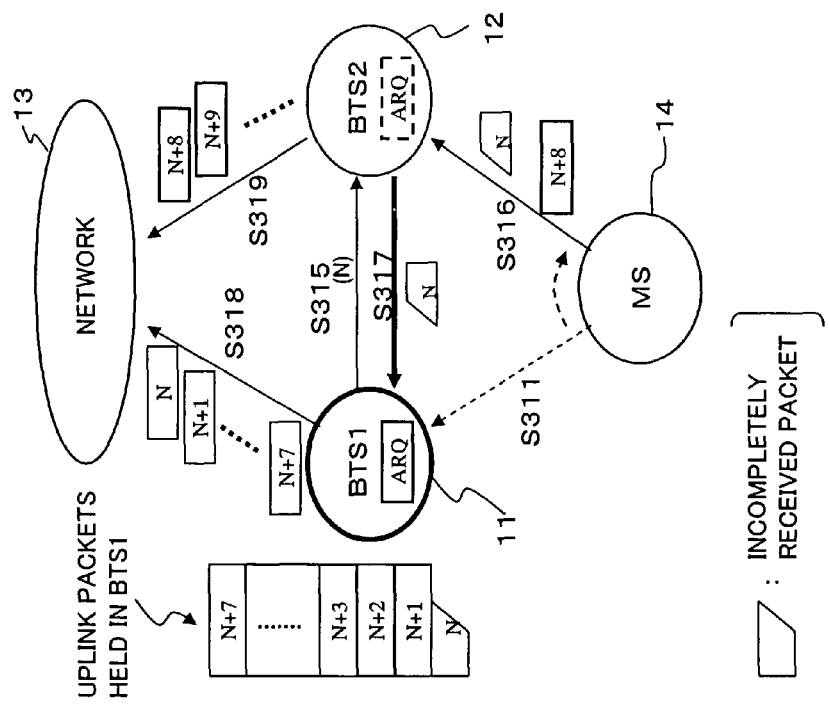
FIGS. 2A and 2B are schematic diagrams of a mobile communications system schematically showing two methods for transferring data at the time of handover according to a third exemplary embodiment of the present invention.

FIG. 1A is a schematic diagram of a mobile communications system schematically showing a method for transferring data at the time of handover according to a first exemplary embodiment of the present invention. Here, to simplify the description, it is assumed that two base stations 11 and 12 (BTS1 and BTS2, respectively) are each connected to a network 13 and that a mobile station 14 (MS) moves with the base stations 11 and 12 as its source base station and target base station, respectively.

First, before a handover occurs, the mobile station 14 sets an ARQ process with the base station 11 and sequentially transmits packets D(N), D(N+1), . . . , D(N+7) to the base station 11 (S111). It is assumed that there are several incompletely received packets among the packets received by the base station 11. Here, the packets D(N), D(N+6), and D(N+7) are incompletely received packets.

Hereinafter, an incompletely received packet will be denoted with the addition of an asterisk, like D*(N). In the drawings, an incompletely received packet or its corresponding completely received packet is represented by its sequence number in a trapezoid. The number "x" of a data packet D(x) is a sequence number assigned by the mobile station 14 to the packet. The larger "x" is, the later (the newer, in general) the packet is. Although eight packets D(N) to D(N+7) are illustrated here as an example, the number of packets, of course, do not need to be limited.

When a handover is decided in the state where the uplink packets D*(N) to D*(N+7) are held by the source base station 11, data transfer control is carried out by a series of steps as follows.

1) Step 1.1

To terminate the ARQ process, the source base station 11 notifies the target base station 12 of information required for retransmission of the incompletely received packets, for example a reception status report (S112). For the information required for retransmission, information specifying the incompletely received packets, such as their sequence numbers for example, can be used. Alternatively, ARQ information can also be used, containing parameters such as the sequence numbers of the packets, reception status (completely/incompletely received) of each packet, presence or absence of a request for retransmission at the source base station, and time at which the request for retransmission is made.

2) Step 1.2

When the mobile station 14 has made a cell change to the target base station 12, the target base station 12 presents the reception status report or a request to retransmit the incompletely received packets, to the mobile station 14, by using the information notified from the source base station 11. In response to this, the mobile station 14 preferentially transmits the data packets that allow the source base station 11 to terminate the ARQ process, that is to say the retransmission packets (S113). Here, the packets D(N), D(N+6), and D(N+7) are retransmitted to the target base station 12.

3) Step 1.3

When the target base station 12 has completely received the retransmission packets corresponding to the incompletely received packets from the mobile station 14, the target base station 12 transfers these retransmission packets to the source base station 11 (S114). The source base station 11 carries out the ARQ process by using the retransmission packets and transmits a series of the completely received packets to the network 13 (S115). Here, upon the complete receipt of the retransmission packet D(N), the source base station 11 transmits the uplink packets D(N) to D(N+5) in this order. Upon the complete receipt of the retransmission packets D(N+6) and D(N+7), the source base station 11 transmits the uplink packets D(N+6) and D(N+7) in this order.

4) Step 1.4

When all the packets requested to be retransmitted have been completely transferred to the source base station 11, the source base station 11 terminates the ARQ process if there are no more packets in the mobile station 14 to transmit to the source base station 11.

5) Step 1.5

Subsequently, the target base station 12 becomes the serving base station (SBTS: Serving BTS) of the mobile station 14 and sets a new ARQ relationship with the mobile station 14 by sending the mobile station 14 a request to resume uplink transmission. At this request, the mobile station 14 starts transmitting new packets to the target base station 12. Here, subsequent uplink packets D(N+8), . . . are transmitted to the target base station 12.

6) Step 1.6

After becoming the serving base station (SBTS) of the mobile station 14, when the target base station 12 has completely received several uplink data packets from the mobile station 14, the target base station 12 transmits these packets to the network 13 (S116). Here, the subsequent uplink packets D(N+8), D(N+9), . . . are transmitted from the target base station 12 to the network 13.

According to the above-described procedure, the uplink packets held at the source base station 11 are transmitted to the network 13 from the source base station 11, and the uplink packets newly received by the target base station 12 from the mobile station 14 are transmitted to the network 13 from the target base station 12.

As described above, according to the first exemplary embodiment of the present invention, the retransmission packets are reversely transferred from the target base station 12 to the source base station 11, and then the packets, as a series of completely received packets, are transmitted from the source base station 11 to the network 13. Accordingly, the amount of traffic between the base stations can be reduced in comparison with the scheme of forwarding all the uplink packets held by the source base station 11 to the target base station 12. As a result, it is possible to achieve higher-speed uplink data transmission and a reduction in the duration of a communication interruption. The present invention exhibits greater effects in particular as the proportion of incompletely received packets becomes smaller in the packets held by the source base station 11, because the amount of packet transfer between the base stations is reduced.

Incidentally, although a packet is used as a unit of retransmission performed through ARQ in the present exemplary embodiment, the unit may be a transmission unit included in a packet or may be a data unit. Taking as an example the case where the mobile station 14 transmits one uplink packet D(N) to the source base station 11, the mobile station 14 disassembles the packet into a plurality of parts and transmits each part to the source base station 11. In this case, there are some occasions when some of the parts are successfully received by the source base station 11 while the other parts result in error. Accordingly, the source base station 11 notifies the target base station 12 of information specifying the parts in error, and the target base station 12 sends a request for retransmission to the mobile station 14, whereby only the parts in error can be reversely transferred from the target base station 12 to the source base station 11. Since the parts in error only are retransmitted, the amount of data transfer between the base stations can be further reduced. This similarly applies to the exemplary embodiments described below.

2. Second Exemplary Embodiment

In the first exemplary embodiment, as described in Steps 1.4 and 1.5, after the ARQ process with the source base station 11 is terminated, the ARQ process with the target base station 12 is started. It is undesirable that the mobile station 14 transmits a subsequent new uplink packet into the ARQ process with the source base station 11. On the contrary, the mobile station 14 needs to start transmitting new uplink packets after the ARQ process with the source base station 11 is terminated. In other words, the mobile station 14 cannot start transmitting uplink packets until the ARQ process with the source base station 11 is terminated. This means that communications are interrupted during this period of time.

Therefore, according to the second exemplary embodiment of the present invention, when a handover to the target base station 12 takes place, a new ARQ process is set between the mobile station 14 and the target base station 12. Thereby, in parallel with the retransmission of packets using the ARQ process with the source base station 11, the mobile station 14 can transmit new uplink packets by using the ARQ process with the target base station 12. Accordingly, the duration of a communication interruption can be reduced.

FIG. 1B is a schematic diagram of a mobile communications system schematically showing a method for transferring data at the time of handover according to the second exemplary embodiment of the present invention. To simplify the description here as well, it is assumed that two base stations 11 and 12 (BTS1 and BTS2, respectively) are each connected to a network 13 and that a mobile station 14 (MS) moves with the base stations 11 and 12 as its source base station and target base station, respectively.

First, before a handover occurs, the mobile station 14 sets a first ARQ process (ARQ1) with the base station 11 and sequentially transmits packets D(N), D(N+1), . . . , D(N+7) to the base station 11 (S211). However, it is assumed that there are several incompletely received packets among the packets received by the base station 11. Here, the packets D(N), D(N+6), and D(N+7) are incompletely received packets.

When a handover is decided in the state where the uplink packets D*(N) to D*(N+7) are held by the source base station 11, data transfer control is carried out by a series of steps as follows.

1) Step 2.1

The source base station 11, to terminate its ARQ process (ARQ1), notifies the target base station 12 of information required for retransmission of the incompletely received packets, for example a reception status report (S212). For the information required for retransmission, information specifying the incompletely received packets, such as their sequence numbers for example, can be used. Alternatively, ARQ information can also be used, containing parameters such as the sequence numbers of the packets, reception status (completely/incompletely received) of each packet, presence or absence of a request for retransmission at the source base station, and time at which the request for retransmission is made.

2) Step 2.2

When the mobile station 14 has made a cell change to the target base station 12, the target base station 12 presents the reception status report or a request to retransmit the incompletely received packets to the mobile station 14, by using the information notified from the source base station 11. Moreover, the target base station 12 starts a second ARQ process (ARQ2) for transmission of new packets, with the mobile station 14. In response to the request for retransmission from the target base station 12, the mobile station 14 preferentially transmits the data packets that allow the source base station 11 to terminate the ARQ process (ARQ1), that is to say the retransmission packets (S213). Here, the packets D(N), D(N+6), and D(N+7) are transmitted to the target base station 12 in response to the request for retransmission.

3) Step 2.3

When the target base station 12 has completely received the retransmission packets corresponding to the incompletely received packets, from the mobile station 14, the target base station 12 transfers these retransmission packets to the source base station 11 (S214). The source base station 11 carries out the ARQ process by using the retransmission packets and transmits a series of the completely received packets to the network 13 (S215). Here, upon the complete receipt of the retransmission packet D(N), the source base station 11 transmits the uplink packets D(N) to D(N+5) in this order. Upon the complete receipt of the retransmission packets D(N+6) and D(N+7), the source base station 11 transmits the uplink packets D(N+6) and D(N+7) in this order.

4) Step 2.4

In parallel with the transmission of the retransmission packets, the mobile station 14 transmits new uplink packets to the target base station 12 by using the second ARQ process (ARQ2). These new uplink packets are stored in the target base station 12. Here, a new packet D(N+8) is transmitted from the mobile station 14 to the target base station 12.

5) Step 2.5

When all the packets requested to be retransmitted have been completely transferred to the source base station 11, the source base station 11 terminates its own ARQ process if there are no more packets in the mobile station 14 to transmit to the source base station 11.

6) Step 2.6

When the target base station 12 has become the serving base station (SBTS) of the mobile station 14, the target base station 12 transmits the stored new uplink packets received from the mobile station 14 to the network 13 (S216).

As described above, according to the second exemplary embodiment of the present invention, the second ARQ process is set between the mobile station 14 and the target base station 12, whereby the mobile station 14 can transmit new uplink packets to the target base station 12 in parallel with the retransmission of packets using the first ARQ process with the source base station 11. Therefore, without waiting until the first ARQ process with the source base station 11 is terminated, the mobile station 14 can transmit subsequent uplink packets to the target base station 12. Accordingly, the duration of a communication interruption can be further reduced.

3. Third Exemplary Embodiment

The above-described first and second exemplary embodiments have the effect that the amount of packet transfer between the base stations is reduced as the proportion of the incompletely received packets held by the source base station 11 becomes smaller. Conversely, when the proportion of the incompletely received packets is large, the amount of packet transfer between the base stations is large, because many a retransmission packet is reversely transferred from the target base station 12 to the source base station 11.

Therefore, according to a third exemplary embodiment of the present invention, with consideration given to the proportion of the incompletely received packets held by the source base station 11, as well as to the capacities and load states of the base stations and network, it is determined whether or not to reversely transfer the retransmission packets from the target base station 12 to the source base station 11 so that the amount of data transfer between the base stations becomes smaller.

Figure 2A:
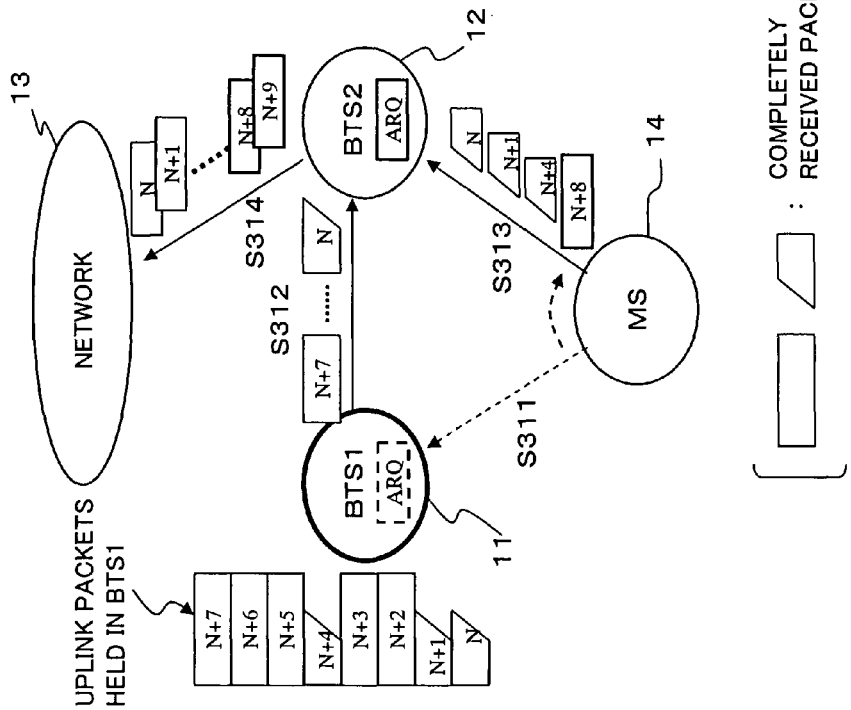

FIGS. 2A and 2B are schematic diagrams of a mobile communications system schematically showing two methods for transferring data at the time of handover according to the third exemplary embodiment of the present invention. To simplify the description here as well, it is assumed that two base stations 11 and 12 (BTS1 and BTS2, respectively) are each connected to a network 13 and that a mobile station 14 (MS) moves with the base stations 11 and 12 as its source base station and target base station, respectively.

First, before a handover occurs, the mobile station 14 sets an ARQ process with the base station 11 and sequentially transmits packets D(N), D(N+1), . . . , D(N+7) to the base station 11 (S311). However, it is assumed that there are several incompletely received packets among the packets received by the base station 11.

As mentioned earlier, an incompletely received packet is denoted with the addition of an asterisk, like D*(N). In the drawings, an incompletely received packet or its corresponding completely received packet is represented by its sequence number in a trapezoid. The number "x" of a data packet D(x) is a sequence number assigned by the mobile station 14 to the packet. The larger "x" is, the later (the newer, in general) the packet is. Note that although eight packets D(N) to D(N+7) are illustrated here as an example to simplify the description, the number of packets, of course, do not need to be limited.

A) In Case of Large Proportion of Incompletely Received Packets

When a handover is decided in the state where the uplink packets D*(N) to D(N+7) are held by the source base station 11, the source base station 11 carries out forward data transfer control as follows in the case where the proportion of the incompletely received packets held is not smaller than a predetermined threshold value and it is determined that the forwarding scheme by which all the held packets are transferred to the target base station 12 is more advantageous in terms of a reduction in the amount of data transfer between the base stations. Here, the packets D(N), D(N+1), and D(N+4) are incompletely received packets.

1) Step 3A.1

The uplink packets held by the source base station 11, as well as ARQ information, are transferred to the target base station 12 (S312). The ARQ information contains parameters such as the sequence numbers of the packets, reception status (completely/incompletely received) of each packet, presence or absence of a request for retransmission at the source base station, and time at which the request for retransmission is made, for example.

2) Step 3A.2

When the mobile station 14 has made a cell change to the target base station 12, the target base station 12 starts an ARQ procedure with the mobile station 14 by using the ARQ information notified from the source base station 11. That is, the mobile station 14 retransmits the incompletely received packets in response to a request for retransmission from the target base station 12 (S313). Here, the packets D(N), D(N+1), and D(N+4) are transmitted to the target base station 12 in response to the request for retransmission.

3) Step 3A.3

When the target base station 12 has completely received the retransmission packets corresponding to the incompletely received packets from the mobile station 14, the target base station 12, using these retransmission packets, transmits the uplink packets D(N) to D(N+7) in this order to the network 13 and also transmits a subsequent packet D(N+8) to the network 13 similarly through the ARQ process.

B) In Case of Small Proportion of Incompletely Received Packets

When a handover is decided in the state where the uplink packets D*(N) to D(N+7) are held by the source base station 11, the source base station 11 carries out data transfer control as in the above-described first or second exemplary embodiment in the case where the proportion of the incompletely received packets held is smaller than the predetermined threshold value and it is determined that the data transfer control as in the first or second exemplary embodiment has a significant advantage over the scheme of transferring all the held packets to the target base station 12, in terms of a reduction in the amount of data transfer between the base stations. Here, description will be given of the case of using the procedure according to the first exemplary embodiment, assuming that the packet D(N) is an incompletely received packet.

1) Step 3B.1

The source base station 11, to terminate its own ARQ process, notifies the target base station 12 of information required for retransmission of the incompletely received packet, for example a reception status report (S315). For the information required for retransmission, information specifying the incompletely received packet, such as its sequence number for example, can be used. Alternatively, ARQ information can also be used, containing parameters such as the sequence numbers of the held packets, reception status (completely/incompletely received) of each packet, presence or absence of a request for retransmission at the source base station, and time at which the request for retransmission is made.

2) Step 3B.2

When the mobile station 14 has made a cell change to the target base station 12, the target base station 12 presents the reception status report or a request to retransmit the incompletely received packet to the mobile station 14, by using the information notified from the source base station 11. In response to this, the mobile station 14 preferentially transmits the data packet that allows the source base station 11 to terminate the ARQ process, that is to say the retransmission packet (S316). Here, the packet D(N) is retransmitted to the target base station 12.

3) Step 3B.3

When the target base station 12 has completely received the retransmission packet corresponding to the incompletely received packet from the mobile station 14, the target base station 12 transfers this retransmission packet to the source base station 11 (S317). The source base station 11 carries out the ARQ process by using the retransmission packet and transmits a series of the completely received packets to the network 13 (S318). Here, upon the complete receipt of the retransmission packet D(N), the source base station 11 transmits all the uplink packets D(N) to D(N+7) in this order.

4) Step 3B.4

When having completely receiving the packet requested to be retransmitted, the source base station 11 terminates its own ARQ process if there are no more packets in the mobile station 14 to transmit to the source base station 11.

5) Step 3B.5

Subsequently, the target base station 12 becomes the serving base station (SBTS) of the mobile station 14 and sets a new ARQ relationship with the mobile station 14 by sending the mobile station 14 a request to resume uplink transmission. The mobile station 14 starts transmitting new packets to the target base station 12. Here, subsequent uplink packets D(N+8), ... are transmitted to the target base station 12.

6) Step 3B.6

After becoming the serving base station (SBTS) of the mobile station 14, when the target base station 12 has completely received several uplink data packets from the mobile station 14, the target base station 12 transmits these packets to the network 13 (S319). Here, the subsequent uplink packets D(N+8), D(N+9), ... are transmitted from the target base station 12 to the network 13.

As described above, by using the predetermined threshold value determined with consideration given to the proportion of the incompletely received packets held by the source base station 11 as well as to the capacities and load states of the base stations and network, it is determined whether to reversely transfer the retransmission packets from the target base station 12 to the source base station 11, or to perform the forward data transfer. Thereby, it is possible to avoid a situation where the amount of traffic between the base stations is unnecessarily increased.

Note that when the proportion of the incompletely received packets is smaller than the predetermined threshold value, it is also possible to adopt the data transfer control according to the second exemplary embodiment. In this case, as in the second exemplary embodiment, the duration of a communication interruption can be further reduced.

In addition, in the system according to the above-described third exemplary embodiment, it is possible for a base station to switch between the forward transfer control shown in FIG. 2A and the reverse transfer control shown in FIG. 2B. Therefore, for example, even when a communication path between the source base station 11 and the network 13 is disabled due to some failure, it is possible to maintain the communication by switching the control as shown in FIG. 2A. In other words, the system according to the above-described third exemplary embodiment can also function as a redundant system to provide enhanced protection and reliability.

4. Fourth Exemplary Embodiment

Figure 3B:
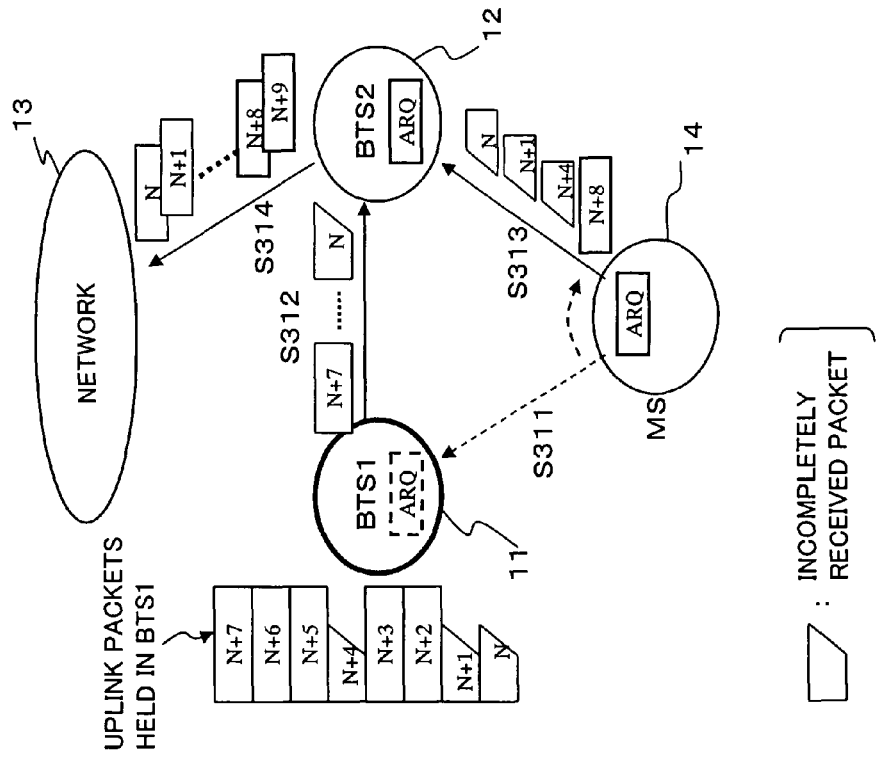
FIGS. 3A and 3B are schematic diagrams of mobile communications systems schematically showing methods for transferring data at the time of handover, where
Figure 3A:
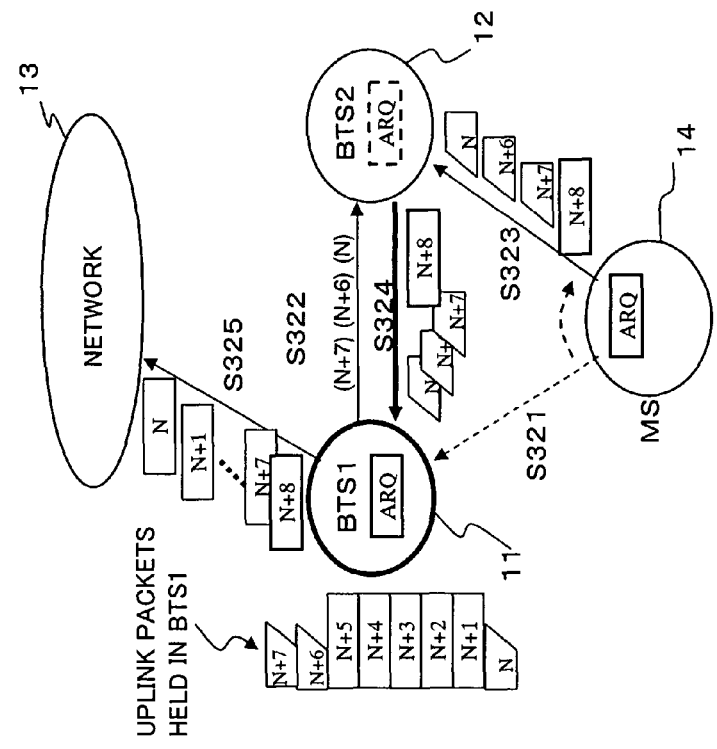

FIG. 3A is a schematic diagram of a mobile communications system schematically showing a method for transferring data at the time of handover according to a fourth exemplary embodiment of the present invention. Here, to simplify the description, it is assumed that two base stations 11 and 12 (BTS1 and BTS2, respectively) are physically connected to each other, that the base station 11 is physically connected to a network 13, and that the base station 12 is not physically connected to the network 13 but is logically connected thereto through the base station 11. Moreover, it is assumed that a mobile station 14 (MS) moves with the base stations 11 and 12 as its source base station and target base station, respectively. Note that the reason why the base station 12 is not physically connected to the network 13 may be that its network architecture is configured as such or that a communication path between the base station 12 and the network 13 is disabled due to some failure.

First, before a handover occurs, the mobile station 14 sets an ARQ process with the base station 11 and sequentially transmits packets D(N), D(N+1), . . . , D(N+7) to the base station 11 (S321). However, it is assumed that there are several incompletely received packets among the packets received by the base station 11. Here, the packets D(N), D(N+6), and D(N+7) are incompletely received packets.

As mentioned earlier, an incompletely received packet is denoted with the addition of an asterisk, like D*(N). In the drawings, an incompletely received packet or its corresponding completely received packet is represented by its sequence number in a trapezoid. The number "x" of a data packet D(x) is a sequence number assigned by the mobile station 14 to the packet. The larger "x" is, the later (the newer, in general) the packet is. Although eight packets D(N) to D(N+7) are illustrated here as an example to simplify the description, the number of packets, of course, do not need to be limited.

When a handover is decided in the state where the uplink packets D*(N) to D*(N+7) are held by the source base station 11, data transfer control is carried out by a series of steps as follows.

1) Step 4.1

To terminate the ARQ process, the source base station 11 notifies the target base station 12 of information required for retransmission of the incompletely received packets, for example a reception status report (S322). For the information required for retransmission, information specifying the incompletely received packets, such as their sequence numbers for example, can be used. Alternatively, parameters can also be used, such as the sequence numbers of the held packets, reception status (completely received/incompletely received) of each packet, presence or absence of a request for retransmission at the source base station, and time at which the request for retransmission is made.

2) Step 4.2

When the mobile station 14 has made a cell change to the target base station 12, the target base station 12 presents the reception status report or a request to retransmit the incompletely received packets to the mobile station, by using the information notified from the source base station 11. In response to this, the mobile station 14 preferentially transmits the data packets that allow the source base station 11 to terminate the ARQ process, that is to say the retransmission packets (S323). Here, the packets D(N), D(N+6), and D(N+7) are retransmitted to the target base station 12.

3) Step 4.3

When the target base station 12 has completely received the retransmission packets corresponding to the incompletely received packets from the mobile station 14, the target base station 12 transfers these retransmission packets to the source base station 11 (S324). The source base station 11 carries out the ARQ process by using the retransmission packets and transmits a series of the completely received packets to the network 13 (S325). Here, upon the complete receipt of the retransmission packet D(N), the source base station 11 transmits the uplink packets D(N) to D(N+5) in this order. Upon the complete receipt of the retransmission packets D(N+6) and D(N+7), the source base station 11 transmits the uplink packets D(N+6) and D(N+7) in this order.

4) Step 4.4

When having completely received all the retransmission packets, the source base station 11 terminates its own ARQ process if there are no more packets in the mobile station 14 to transmit to the source base station 11.

5) Step 4.5

Subsequently, the target base station 12 becomes the serving base station (SBTS) of the mobile station 14 and sets a new ARQ relationship with the mobile station 14 by sending the mobile station 14 a request to resume uplink transmission. The mobile station 14 starts transmitting new packets to the target base station 12. Here, subsequent uplink packets D(N+8), . . . are transmitted to the target base station 12.

6) Step 4.6

After becoming the serving base station (SBTS) of the mobile station 14, when the target base station 12 has completely received several uplink data packets from the mobile station 14, the target base station 12 transmits these packets to the network 13 via the source base station 11 (S324, S325). Here, the subsequent uplink packets D(N+8), D(N+9), . . . are transmitted from the target base station 12 to the network 13 via the source base station 11.

In this manner, the uplink packets held by the source base station 11 are transmitted to the network 13 from the source base station 11, and the uplink packets newly received by the target base station 12 from the mobile station 14 are transmitted to the network 13 from the target base station 12 through a logical channel via the source base station 11.

As described above, according to the fourth exemplary embodiment of the present invention, retransmission packets are reversely transferred from the target base station 12 to the source base station 11, and then the packets, as a series of completely received packets, are transmitted from the source base station 11 to the network 13. Moreover, a series of new uplink packets are transmitted from the target base station 12 to the network 13 similarly via the source base station 11. Accordingly, even with an architecture in which the target base station 12 is physically connected only to the source base station 11, uplink packets can be transmitted at the time of handover. Accordingly, it is possible to flexibly adapt to a change in the architecture.

5. Fifth Exemplary Embodiment

FIGS. 3A and 3B are schematic diagrams of mobile communications systems schematically showing two methods for transferring data at the time of handover according to a fifth exemplary embodiment of the present invention. The method shown in FIG. 3A is as described above in the fourth exemplary embodiment. The method shown in FIG. 3B is as described above as to the forward transfer control shown in FIG. 2A. According to the fifth exemplary embodiment, the data transfer methods can be switched depending on which of the network architectures shown in FIGS. 3A and 3B a system that the present invention is applied to has.

Specifically, if a system has the network architecture in which two base stations 11 and 12 (BTS1 and BTS2, respectively) are physically connected to each other, the base station 11 is physically connected to a network 13, and the base station 12 is not physically connected to the network 13 but is logically connected thereto through the base station 11 as shown in FIG. 3A, then the procedure of data transfer described in the fourth exemplary embodiment is adopted.

Moreover, if a system has the network architecture in which the base station 12 is physically connected to the network 13, and the base station 11 is not physically connected to the network 13 but is logically connected thereto through the base station 12 as shown in FIG. 3B, then the procedure of forward data transfer shown in FIG. 2A is adopted.

As described above, it is determined depending on the network architecture whether to reversely transfer retransmission packets from the target base station 12 to the source base station 11, or to perform forward data transfer, whereby it is possible to flexibly adapt to various architectures.

6. Base Station

Figure 4:
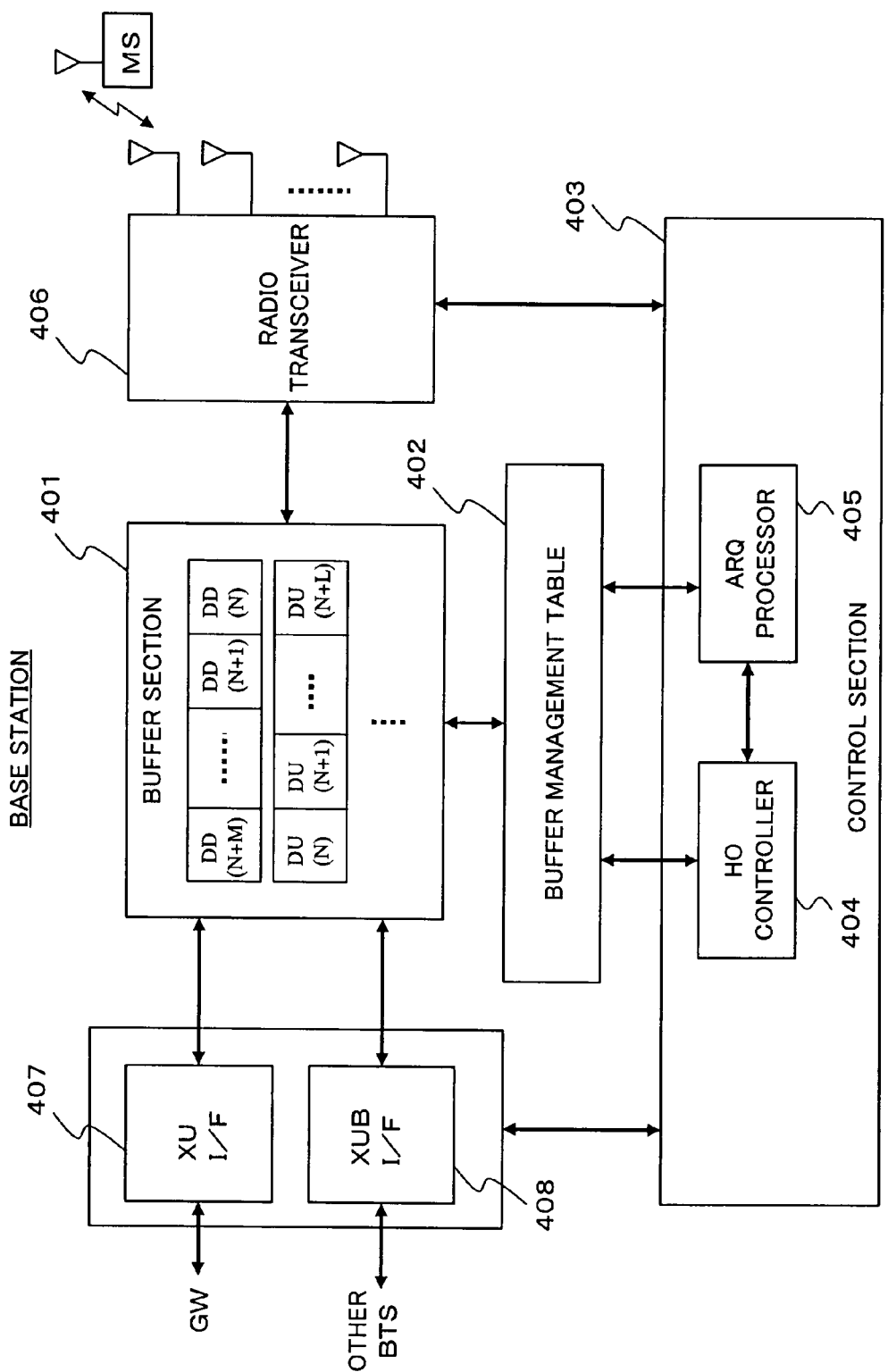
FIG. 4 is a schematic block diagram showing an example of a base station in a mobile communications system according to the present invention.

FIG. 4 is a schematic block diagram showing an example of a base station in a mobile communications system according to the present invention. The above-described base stations 11 and 12, as well as other base stations that are not shown, have basically the same configuration of functionality. Hereinafter, description will focus on the configuration of functionality related to the present invention.

The base station has a buffer section 401 for storing downlink data packets DD(N) to DD(N+M), uplink data packets DU (N) to DU (N+L), and other packets. The buffer section 401 is managed by a control section 403 based on a buffer management table 402.

The control section 403 includes a handover controller 404 and an ARQ processor 405. The handover controller 404 and ARQ processor 405 work in conjunction with each other to carry out each control as described above, specifically the ARQ process, forward transfer control, reverse transfer control of retransmission packets, or switching control between the forward transfer control and the reverse transfer control.

Radio communications between the base station and a mobile station are carried out by a radio transceiver 406. The radio transceiver 406 is controlled by the control section 403. Moreover, communications with a gateway, to which each base station gains access, are carried out through a XU interface 407, and communications with another base station are carried out through a XUB interface 408.

By controlling the radio transceiver 406, the control section 403 can monitor the time involved in transmitting and receiving packets to/from a mobile station, the state of the varying channel quality of a radio interface, and the like. Moreover, by controlling the XUB interface 408, the control section 403 can estimate the state (transmission rate, etc.) of an inter-BTS interface XUB between the self base station and another base station on the other end of communication, by using transmission and reception times of packets transmitted to and received from the base station on the other end of communication periodically or as appropriate.

Incidentally, a program-controlled processor such as a CPU can be used for the control section 403, and the control in each of the above-described exemplary embodiments can be implemented by executing a program on the program-controlled processor. According to each exemplary embodiment described above, the control section 403 carries out the data transfer control as follows.

In the case where the base station is the source base station 11 in the first exemplary embodiment shown in FIG. 1A, the control section 403 carries out the operation control of holding the uplink packets received from the mobile station 14, notifying the information required for retransmission of incompletely received packets, receiving the retransmission packets corresponding to the incompletely received packets from the target base station 12, and then transmitting the packets to the gateway. Moreover, in the case where the base station is the target base station 12 in the first exemplary embodiment, the control section 403 carries out the operation control of sending the request for retransmission to the mobile station 14 in accordance with the retransmission request information received from the station 11, and reversely transferring the retransmission packets received in response to the request to the source base station 11.

In the case where the base station is the target base station 12 in the second exemplary embodiment shown in FIG. 1B, the control section 403 carries out, in parallel with the above-described reverse transfer control, the operation control of starting the ARQ process for transmission of new packets with the mobile station 14, and transmitting new packets from the mobile station 14 to the gateway.

In the case where the base station is the source base station 11 in the third exemplary embodiment shown in any one of FIGS. 2A and 2B, the control section 403 calculates the proportion of incompletely received packets among the uplink packets received from the mobile station 14, and switches between the forward transfer control (FIG. 2A) and the reverse transfer control (FIG. 2B), depending on whether or not the proportion of the incompletely received packets exceeds a predetermined threshold value. In the case where the base station is the target base station 12 in the third exemplary embodiment, the control section 403 determines which of the forward transfer control (FIG. 2A) and the reverse transfer control (FIG. 2B) to perform, in accordance with the notification from the source base station 11, and when determining to perform the reverse transfer control, transfers the retransmission packets from the mobile station 14 to the source base station 11.

In the case where the base station is the source base station 11 in the fourth exemplary embodiment shown in FIG. 3A, the control section 403 carries out the operation control of holding the uplink packets received from the mobile station 14, notifying the target base station 12 of the information required for retransmission of incompletely received packets, receiving the retransmission packets corresponding to the incompletely received packets, or new packets, from the target base station 12, and then transmitting the packets to the gateway. In the case where the base station is the target base station 12 in the fourth exemplary embodiment, the control section 403 carries out the operation control of sending the request for retransmission to the mobile station 14 in accordance with the retransmission request information received from the source base station 11, and reversely transferring the retransmission packets received in response to this request, or new packets, to the source base station 11.

In the case where the base station is the source base station 11 in the fifth exemplary embodiment shown in any one of FIGS. 3A and 3B, the control section 403 determines either the reverse transfer control (FIG. 3A) or the forward transfer control (FIG. 3B) as the control method, depending on the set network architecture.

7. Mobile Station

Figure 5:
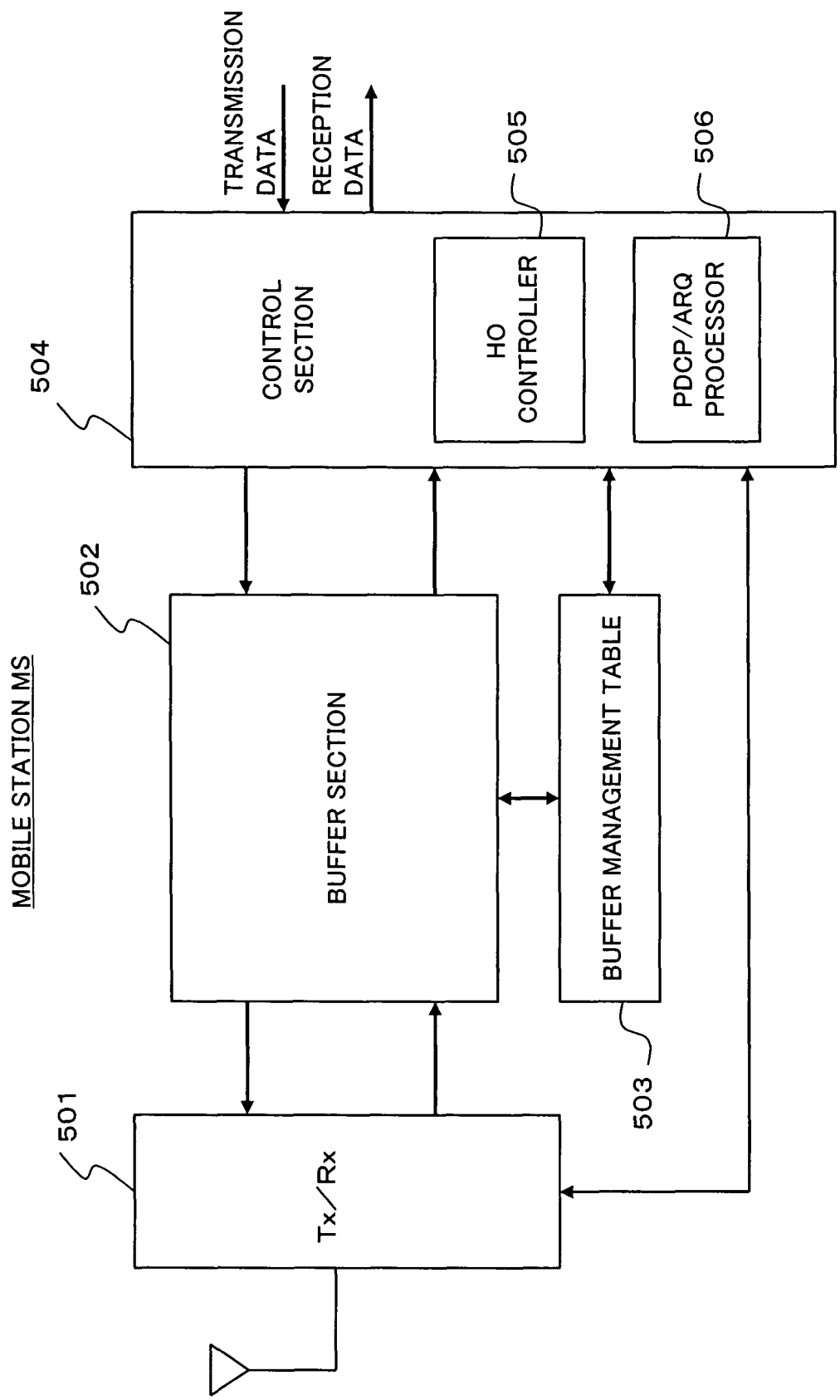
FIG. 5 is a schematic block diagram showing an example of a mobile station in a mobile communications system according to the present invention.

FIG. 5 is a block diagram showing an example of a mobile station in a mobile communications system according to the present invention. Here, the parts related to the present invention only are shown.

The mobile station includes a radio transceiver 501 for communicating with a base station through a radio interface. Data to transmit and data received are stored in a buffer section 502. The buffer section 502 is controlled by a control section 504 using a management table 503. The control section 504 functionally includes a handover controller 505 and an ARQ processor 506 and carries out control as described above, such as the retransmission of packets through an ARQ process, setting of an ARQ process with each of the source and target base stations, decision about a handover, execution of a handover command, and establishment of synchronization with the target base station.

In the second exemplary embodiment shown in FIG. 1B, when the mobile station 14 receives a reception status report or request for retransmission from the target base station 12, the control section 504 retransmits the packet corresponding to a reportedly incompletely received packet to the target base station 12, sets a new ARQ process with the target base station 12 at the same time, and in parallel with the transmission of the retransmission packet, also transmits a new packet to the target base station 12.

Incidentally, the mobile station 14 is user equipment having communication functionality and information processing functionality. For example, the mobile station 14 is a portable telephone terminal, portable information terminal, or the like.

8. First Example

8.1) Network Architecture I

Figure 6:
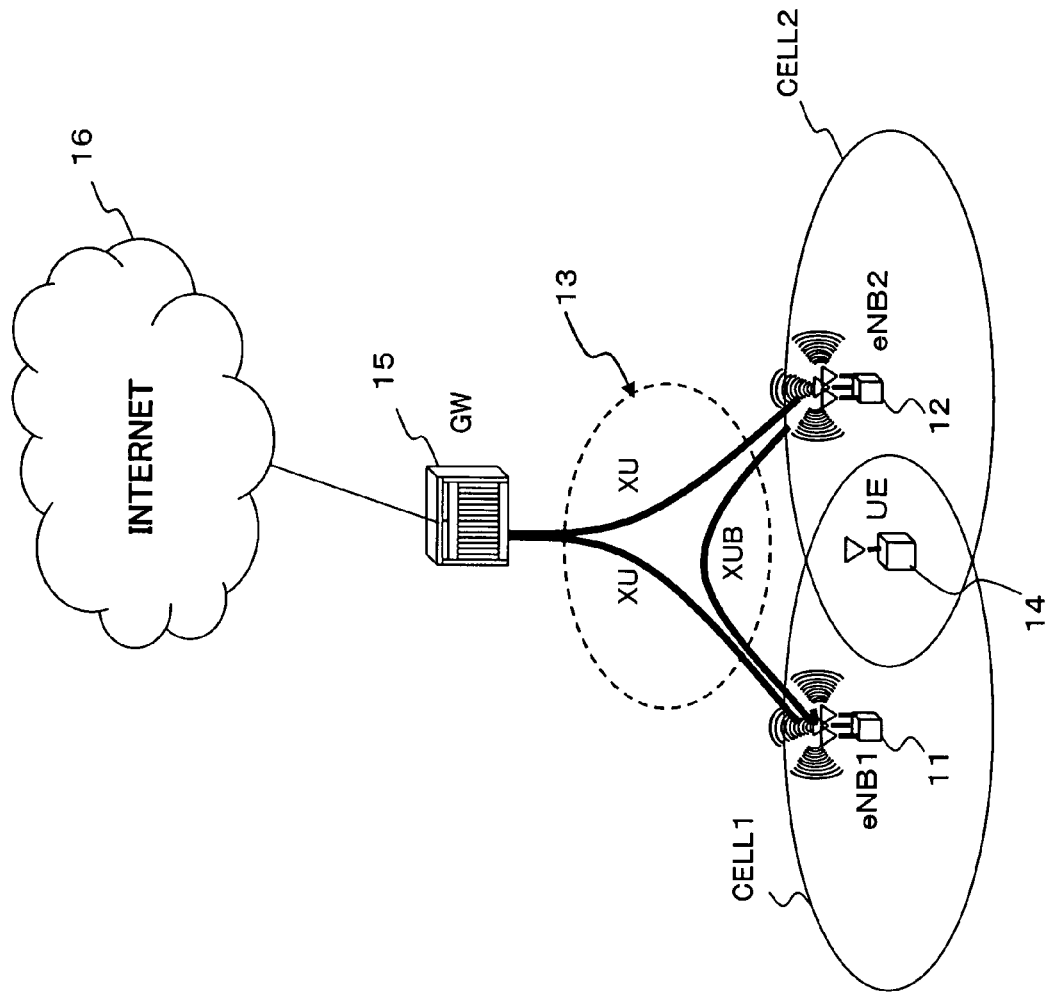
FIG. 6 is a diagram schematically showing a network architecture I of a mobile communications system.

FIG. 6 is a diagram schematically showing a network architecture I of a mobile communications system. Here, to simplify the description, it is assumed that base stations 11 and 12 (eNB1 and eNB2, respectively) and a gateway 15 (GW) are connected to one another through a network 13, and that with the base station 11 as its source base station, a mobile station (UE) 14 is moving from a cell 1 of the base station 11 to a cell 2 of the target base station 12. The mobile station 14 transmits and receives data packets to/from the Internet 16 through the network 13. Hereinafter, it is assumed that communications between the base stations are carried out through an interface XUB and that communications between each base station and the gateway 15 are carried out through an interface XU. The first example of the present invention is an application of the first exemplary embodiment of the present invention to the present network architecture I.

8.2) Protocol Control

Figure 7:
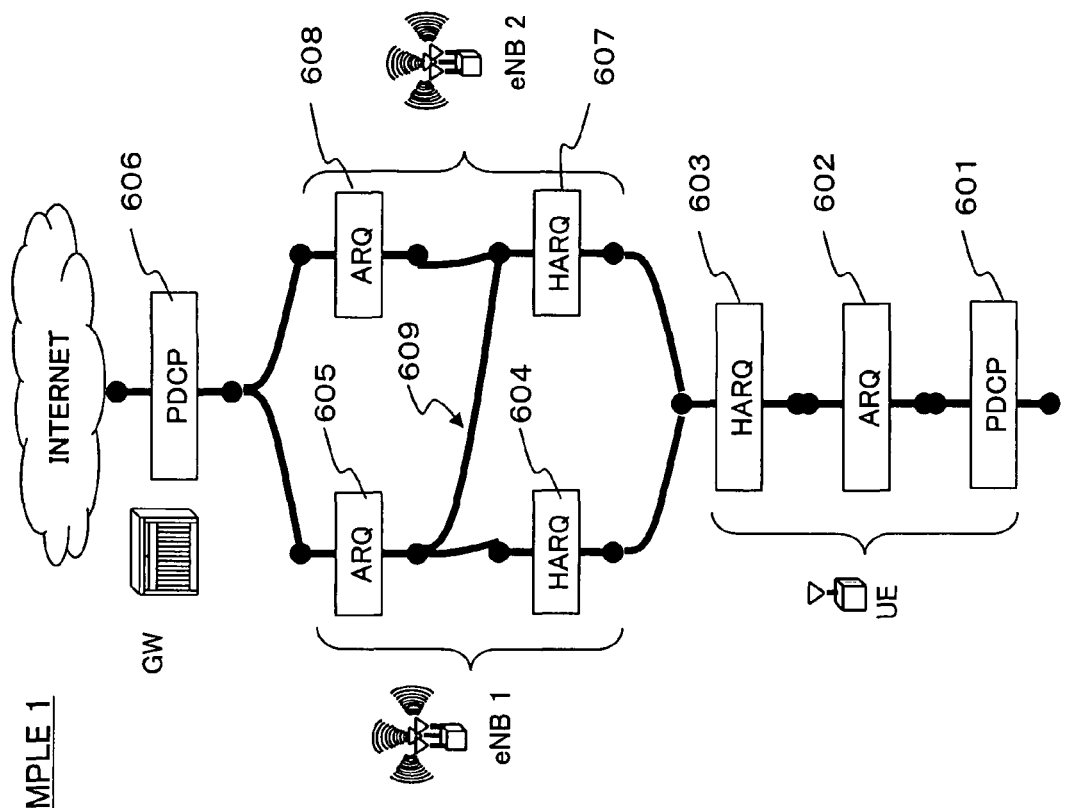
FIG. 7 is a diagram of a protocol structure of a mobile communications system according to a first example of the present invention.
Figure 8:
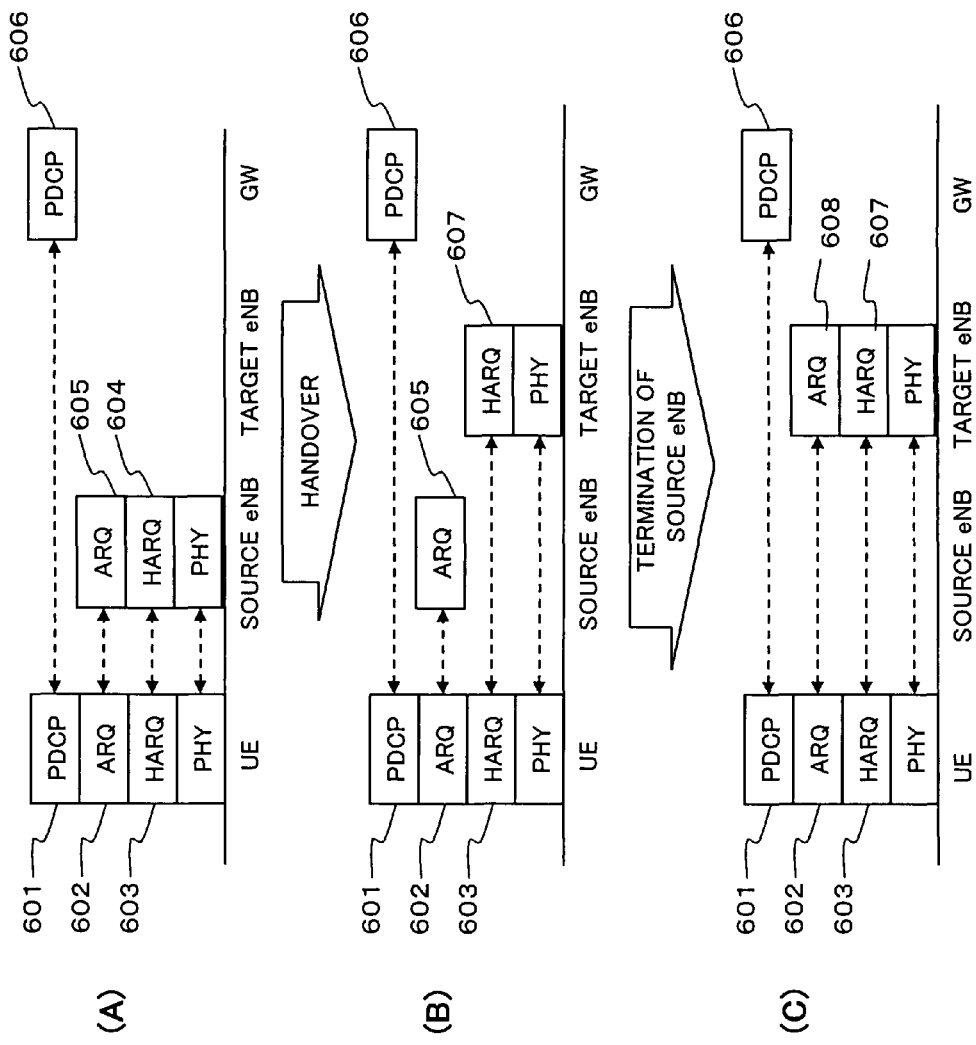
FIG. 8 is a diagram showing protocol correspondences among a mobile station, base stations, and a gateway shown in FIG. 7.

FIG. 7 is a diagram showing a protocol structure of the mobile communications system according to the first example of the present invention. FIG. 8 is a diagram showing the protocol correspondences among the mobile station, base stations, and gateway. The protocols used in the present example, related to the retransmission and reverse transfer control, are as follows.

HARQ (Hybrid ARQ) is a retransmission protocol at Layer 1, including an error correction coding (FEC) function, and renders retransmission control based on an ACK/NACK feedback from the receiving side.

ARQ (Automatic Repeat reQuest) is an error correction protocol rendering the control of retransmitting the data packet corresponding to a data packet containing an error, to correct the error. In the present example, when an error still remains despite the error correction function in the lower layer (here, HARQ process), error correction is carried out by retransmitting the data packet corresponding to the one containing the error.

In addition, PDCP (Packet Data Convergence Protocol) is a protocol rendering the compression of an IP header, encoding of an IP packet, and the like and is present at the gateway GW in the present example. PHY (PHYsical layer protocol) is a protocol here related to radio communications between a mobile station and a base station.

Note that although the two-layered protocol stack ARQ/HARQ is used for the error correction functionality in the present example, the error correction functionality is not limited to this protocol structure.

Referring to FIGS. 7 and 8, error correction is carried out through HARQ 603 at the mobile station UE and HARQ 604 at the source base station eNB1. If an error still remains even after this HARQ process, error correction by means of packet retransmission is further carried out through ARQ 602 at the mobile station UE and ARQ 605 at the source base station eNB1. In addition, PDCP 601 at the mobile station UE is configured based on PDCP 606 at the gateway GW.

Subsequently, when a handover is decided, the source base station eNB1 notifies the target base station eNB2 of information about a packet that needs to be retransmitted. However, the source base station eNB1 does not clear ARQ 605 but maintains the ARQ control between the mobile station UE and itself.

The target base station eNB2 is notified of the information about a packet that needs to be retransmitted, and the mobile station UE connects to the cell of the target base station eNB2, whereby in accordance with a HARQ process through HARQ 607 at itself and HARQ 603 at the mobile station UE, the target base station eNB2 receives the retransmission packet from the mobile station UE and transfers it to the source base station eNB1 through a reverse transfer route 609. Since ARQ 605 at the source base station eNB1 is maintained, the source base station eNB1 can terminate ARQ 605 by receiving the retransmission packet through the reverse transfer route 609.

When all retransmission packets have been completely delivered to the source base station eNB1, the target base station eNB2 generates an ARQ process between ARQ 608 at itself and ARQ 602 at the mobile station UE, receives a new packet from the mobile station UE, and transmits the new packet to the gateway GW.

8.3) Uplink Data Transmission

Figure 9:
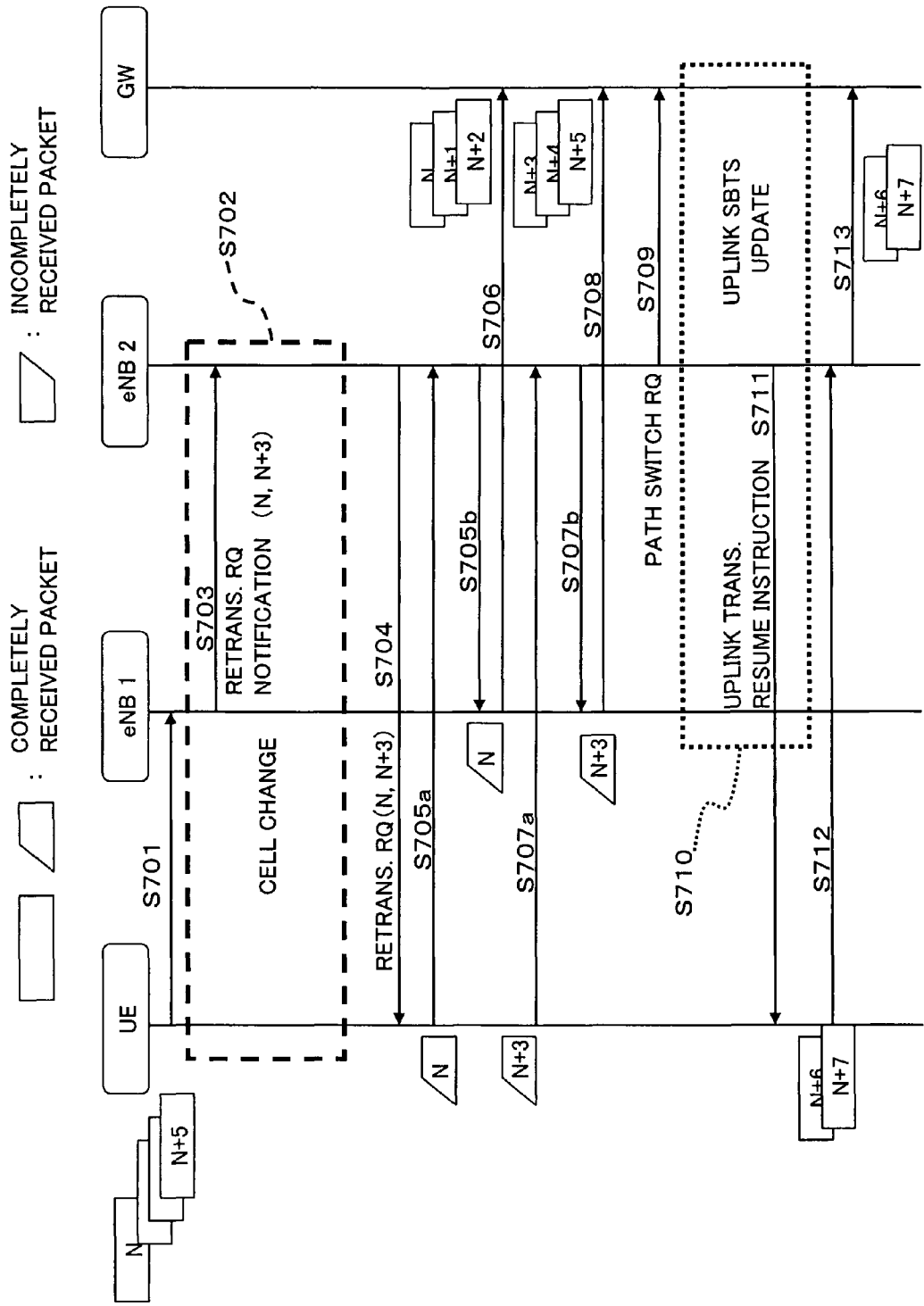
FIG. 9 is a sequence diagram showing a procedure of uplink data transmission at the time of handover according to the first example of the present invention.

FIG. 9 is a sequence diagram showing a procedure of uplink data transmission during handover according to the first example of the present invention. It is assumed that the above-described protocol control shown in FIGS. 7 and 8 is carried out here.

First, the mobile station UE transmits data packets D(N), . . . , D(N+5) to the source base station eNB1 (S701). Not all the packets can be completely received by the source base station eNB1, and it is assumed hereinafter that the data packets D*(N) and D*(N+3) are incompletely received packets. In this case, the control section 403 of the source base station eNB1 presents a reception status report to the mobile station UE and stores these uplink data packets D*(N) to D(N+5) in the buffer section 401 until the packets corresponding to the incompletely received packets are sequentially retransmitted from the mobile station UE and all become completely received packets.

At this point in time, it is assumed that the handover controller 505 of the mobile station UE determines that a handover is needed and sends the source base station eNB1 a request for a handover to the target base station eNB2. At this request, the handover controllers 404 of the source base station eNB1 and target base station eNB2 carry out mutual adjustment for the handover for the mobile station UE and start handover control (S702). In this event, the ARQ processor 405 of the source base station eNB1 notifies the target base station eNB2 of the sequence numbers (here, "N" and "N+3") of the incompletely received packets that need to be retransmitted (S703).

When the mobile station UE has connected to the target base station eNB2, the ARQ processor 405 of the target base station eNB2 provides the mobile station UE with the sequence numbers "N" and "N+3" of the incompletely received packets that need to be retransmitted (S704). When the ARQ processor 506 of the mobile station UE transmits the retransmission packet D(N) to the target base station eNB2 in response (S705a), the control section 403 of the target base station eNB2 reversely transfers the retransmission packet D(N) to the source base station eNB1 (S705b). Upon receipt of the retransmission packet D(N), the source base station eNB1 transmits the completely received packets D(N) to D(N+2) to the gateway GW (S706).

Similarly, when the mobile station UE transmits the retransmission packet D(N+3) to the target base station eNB2 (S707a), the control section 403 of the target base station eNB2 reversely transfers the retransmission packet D(N+3) to the source base station eNB1 (S707b). Upon receipt of the retransmission packet D(N+3), the source base station eNB1 transmits the completely received packets D(N+3) to D(N+5) to the gateway GW (S708).

When all the untransmitted packets D(N) to D(N+5) have been transmitted in this manner, the handover controller 404 of the target base station eNB2 sends a request to switch a path to the gateway GW (S709), whereby the serving base station (SBTS) of the mobile station UE is updated (S710). The control section 403 of the target base station eNB2 instructs the mobile station UE to resume uplink transmission (S711). In response to this, the mobile station UE transmits new uplink packets D(N+6) and D(N+7) to the serving base station eNB2 (S712). If these packets are completely received, the serving base station eNB2 transmits the packets D(N+6) and D(N+7) to the gateway GW (S713).

8.4) Effects

As described above, according to the first example of the present invention, retransmission packets are reversely transferred from the target base station eNB2 to the source base station eNB1, and then packets, as a series of completely received packets, are transmitted from the source base station eNB1 to the gateway GW. Moreover, a series of new uplink packets are transmitted from the target base station eNB2 to the gateway GW. Accordingly, the amount of traffic between the base stations can be reduced in comparison with the forward transfer scheme by which all the uplink packets held by the source base station eNB1 are transferred to the target base station eNB2. As a result, it is possible to achieve higher-speed uplink data transmission and a reduction in the duration of a communication interruption. The present invention exhibits greater effects in particular as the proportion of the incompletely received packets held by the source base station eNB1 becomes smaller, because the amount of packet transfer between the base stations is reduced.

Note that although a packet is used as a unit of retransmission performed through ARQ in the present embodiment, the unit may be a transmission unit included in a packet or may be a data unit. For example, when the mobile station UE transmits one uplink packet D(N) to the source base station eNB1, the mobile station UE disassembles the packet into a plurality of parts and transmits each part to the source base station eNB1. In this case, there are some occasions when some of the parts are successfully received by the source base station eNB1 while the other parts result in error. Accordingly, the source base station eNB1 notifies the target base station eNB2 of information specifying the parts in error, and the target base station eNB2 sends a request for retransmission to the mobile station UE, whereby only the parts in error can be reversely transferred from the target base station eNB2 to the source base station eNB1. Since the parts in error only are retransmitted, the amount of data transfer between the base stations can be further reduced.

9. Second Example 9.1) Network Architecture

A second example of the present invention is an application of the second exemplary embodiment of the present invention to the network architecture I shown in FIG. 6.

9.2) Protocol Control

Figure 10:
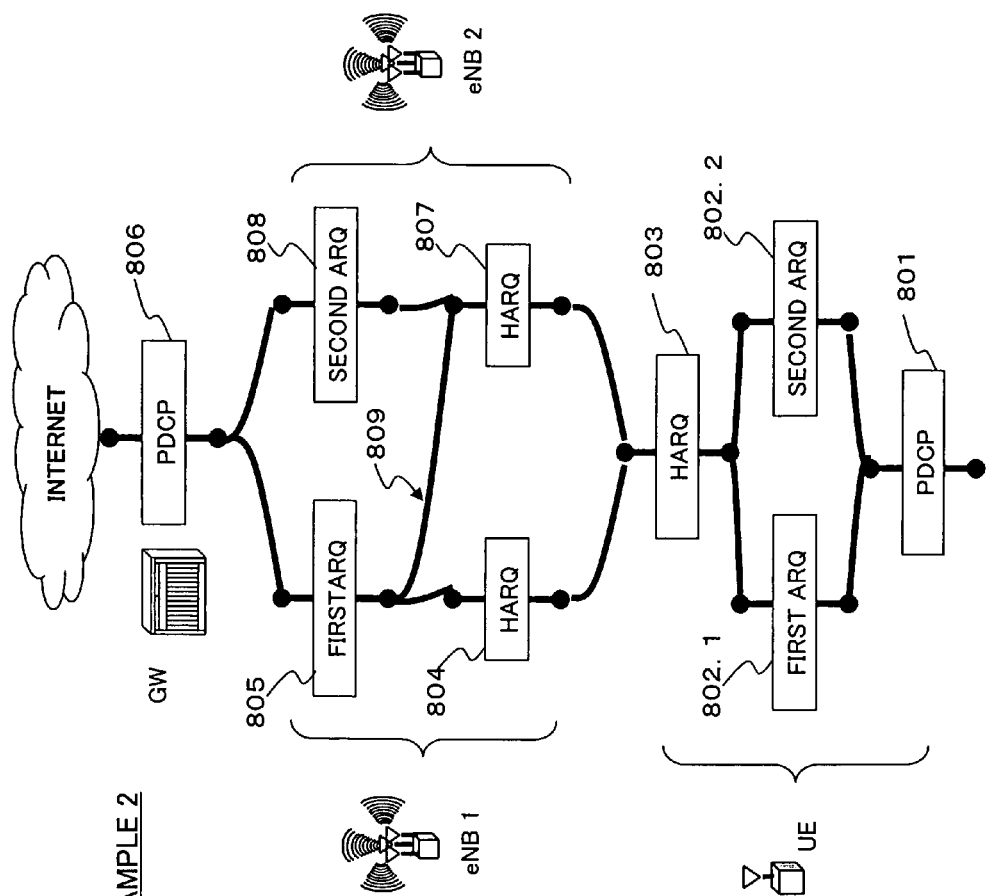
FIG. 10 is a diagram of a protocol structure of a mobile communications system according to a second example of the present invention.
Figure 11:
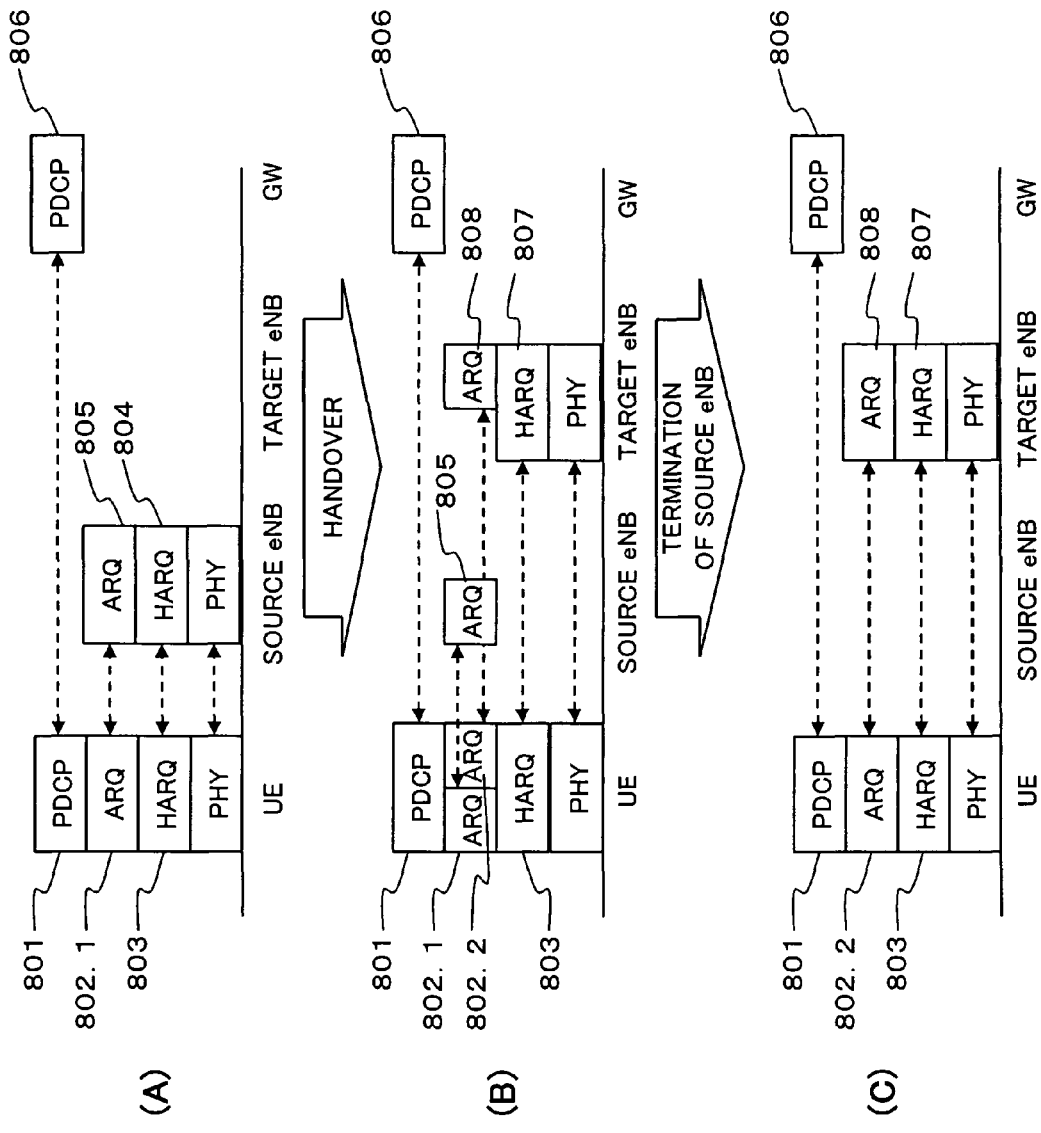
FIG. 11 is a diagram showing protocol correspondences among a mobile station, base stations, and a gateway shown in FIG. 10.

FIG. 10 is a diagram showing a protocol structure of a mobile communications system according to the second example of the present invention. FIG. 11 is a diagram showing the protocol correspondences among the mobile station, base stations, and gateway. The protocols used in the present example, related to the retransmission and reverse transfer control, are HARQ and ARQ, which are the same as those used in the first example, and therefore the description thereof will be omitted. Note that in the present example as well, the error correction functionality is not limited to the ARQ/HARQ protocol stack.

Referring to FIGS. 10 and 11, error correction is carried out through HARQ 803 at the mobile station UE and HARQ 804 at the source base station eNB1. If an error still remains even after this HARQ process, error correction by means of packet retransmission is further carried out through ARQ 802.1 at the mobile station UE and ARQ 805 at the source base station eNB1. In addition, PDCP 801 at the mobile station UE is set based on PDCP 806 at the gateway GW.

Subsequently, when a handover is decided, the source base station eNB1 notifies the target base station eNB2 of information about a packet that needs to be retransmitted. However, ARQ 805 is not cleared but is maintained.

The target base station eNB2 is notified of the information about a packet that needs to be retransmitted, and the mobile station UE connects to the cell of the target base station eNB2, whereby the target base station eNB2 starts a second ARQ process for transmission of new packets, between second ARQ 808 at itself and second ARQ 802.2 at the mobile station UE. The target base station eNB2, in accordance with a HARQ process between HARQ 807 at itself and HARQ 803 at the mobile station UE, receives the retransmission packet from the mobile station UE and transfers it to the source base station eNB1 through a reverse transfer route 809. Since ARQ 805 at the source base station eNB1 is maintained, the source base station eNB1 can terminate its own ARQ process by receiving the retransmission packet through the reverse transfer route 809.

In parallel with the transmission of the retransmission packet according to the first ARQ process through the reverse transfer route 809, the mobile station UE can transmit a new packet to the target base station eNB2 by virtue of the second ARQ process with the target base station eNB2. In this manner, the uplink packets held by the source base station eNB1 are transmitted from the source base station eNB1 to the gateway GW. When the target base station eNB2 has become the serving base station, the new packet received from the mobile station UE is transmitted from the base station eNB2 to the gateway GW.

9.3) Uplink Data Transmission

Figure 12:
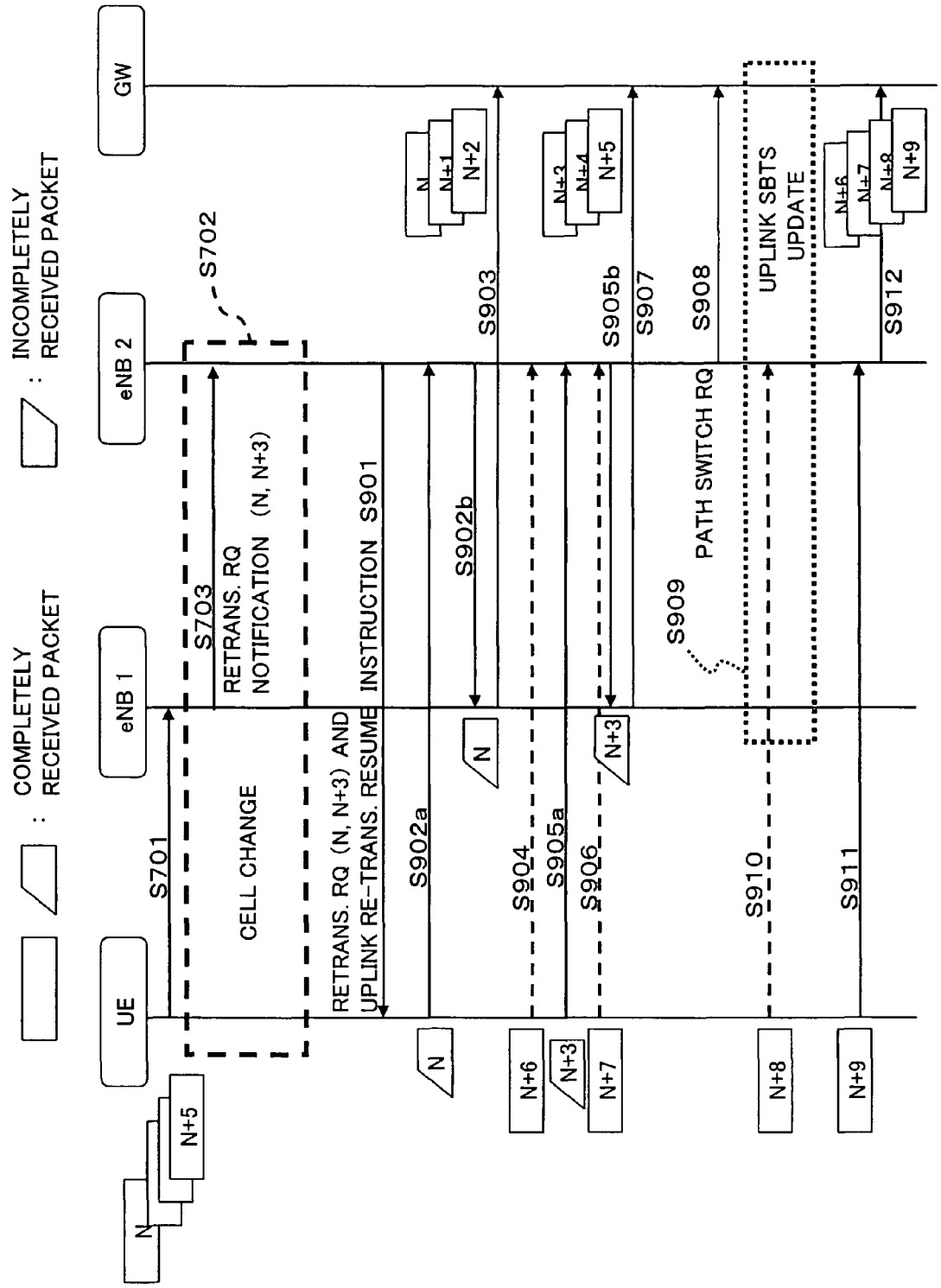
FIG. 12 is a sequence diagram showing a procedure of uplink data transmission during handover according to the second example of the present invention.

FIG. 12 is a sequence diagram showing a procedure of uplink data transmission during handover according to the second example of the present invention. It is assumed that the above-described protocol control shown in FIGS. 10 and 11 is carried out here.

First, the mobile station UE transmits data packets D(N), ..., D(N+5) to the source base station eNB1 (S701). Not all the packets can be completely received by the source base station eNB1, and it is assumed hereinafter that the data packets D*(N) and D*(N+3) are incompletely received packets. In this case, the control section 403 of the source base station eNB1 presents a reception status report to the mobile station UE and stores these uplink data packets D*(N) to D(N+5) in the buffer section 401 until the packets corresponding to the incompletely received packets are sequentially retransmitted from the mobile station UE and all become completely received packets.

At this point in time, it is assumed that the handover controller 505 of the mobile station UE determines that a handover is needed and sends the source base station eNB1 a request for a handover to the target base station eNB2. At this request, the handover controllers 404 of the source base station eNB1 and target base station eNB2 carry out mutual adjustment for the handover for the mobile station UE and start handover control (S702). In this event, the ARQ processor 405 of the source base station eNB1 notifies the target base station eNB2 of the sequence numbers (here, "N" and "N+3") of the incompletely received packets that need to be retransmitted (S703). In addition, when the mobile station UE has connected to the target base station eNB2, the ARQ processor 405 of the target base station eNB2 generates a second ARQ process with the ARQ processor 506 of the mobile station UE.

Subsequently, the target base station eNB2 provides the mobile station UE with the sequence numbers "N" and "N+3" of the incompletely received packets that need to be retransmitted and also instructs the mobile station UE to resume uplink transmission (S901). When the ARQ processor 506 of the mobile station UE transmits the retransmission packet D(N) to the target base station eNB2 in response (S902*a*), the control section 403 of the target base station eNB2 reversely transfers the retransmission packet D(N) to the source base station eNB1 (S902*b*). Upon receipt of the retransmission packet D(N), the source base station eNB1 transmits the completely received packets D(N) to D(N+2) to the gateway GW (S903).

In parallel with this, since the mobile station UE is instructed to resume uplink transmission from the target base station eNB2, the mobile station UE transmits a new uplink packet D(N+6), if it is present, to the target base station eNB2 (S904). Further, when the mobile station UE transmits the retransmission packet D(N+3) to the target base station eNB2 (S905*a*), the control section 403 of the target base station eNB2 reversely transfers the retransmission packet D(N+3) to the source base station eNB1 (S905*b*). Meanwhile, if there is a new uplink packet D(N+7), the mobile station UE transmits it to the target base station eNB2 (S906). Upon receipt of the retransmission packet D(N+3), the source base station eNB1 transmits the completely received packets D(N+3) to D(N+5) to the gateway GW (S907).

When all the untransmitted packets D(N) to D(N+5) have been transmitted in this manner, the handover controller 404 of the target base station eNB2 sends a request to switch a path to the gateway GW (S908), whereby the serving base station (SBTS) of the mobile station UE is updated (S909). Even during this period, if there is a new uplink packet D(N+8), the mobile station UE can transmit it to the target base station eNB2 (S910). When the update of the serving base station is completed in this manner, the mobile station UE transmits a new packet D(N+9) to the serving base station eNB2 (S911).

The packets D(N+6) to D(N+9) held by the serving base station eNB2, if completely received, are transmitted to the gateway GW (S912).

9.4) Effects

As described above, according to the second example of the present invention, retransmission packets are reversely transferred from the target base station eNB2 to the source base station eNB1, and in parallel with this, the mobile station UE can transmit new uplink packets to the target base station eNB2.

Accordingly, the amount of traffic between the base stations can be reduced in comparison with the forward transfer scheme by which all the uplink packets held by the source base station eNB1 are transferred to the target base station eNB2. As a result, it is possible to achieve higher-speed uplink data transmission and a reduction in the duration of a communication interruption. The present invention exhibits greater effects in particular as the proportion of the incompletely received packets held by the source base station eNB1 becomes smaller, because the amount of packet transfer between the base stations is reduced.

Moreover, according to the second example, the second ARQ process is set between the mobile station UE and the target base station eNB2, whereby the mobile station UE can transmit a new uplink packet to the target base station eNB2, in parallel with the retransmission of a packet using the first ARQ process with the source base station eNB1. Therefore, since the mobile station UE can transmit subsequent uplink packets to the target base station eNB2 without waiting until the ARQ process with the source base station eNB1 is terminated, the duration of a communication interruption can be further reduced.

Note that although a packet is used as a unit of retransmission performed through ARQ in the present embodiment, the unit may be a transmission unit included in a packet or may be a data unit. For example, when the mobile station UE transmits one uplink packet D(N) to the source base station eNB1, the mobile station UE disassembles the packet into a plurality of parts and transmits each part to the source base station eNB1. In this case, there are some occasions when some of the parts are successfully received by the source base station eNB1 while the other parts result in error. Accordingly, the source base station eNB1 notifies the target base station eNB2 of information specifying the parts in error, and the target base station eNB2 sends a request for retransmission to the mobile station UE, whereby only the parts in error can be reversely transferred from the target base station eNB2 to the source base station eNB1. Since the parts in error only are retransmitted, the amount of data transfer between the base stations can be further reduced.

10. Third Example 10.1) Network Architecture

A third example of the present invention is an application of the third exemplary embodiment of the present invention to the network architecture I shown in FIG. 6.

10.2) Protocol Control

Figure 13:
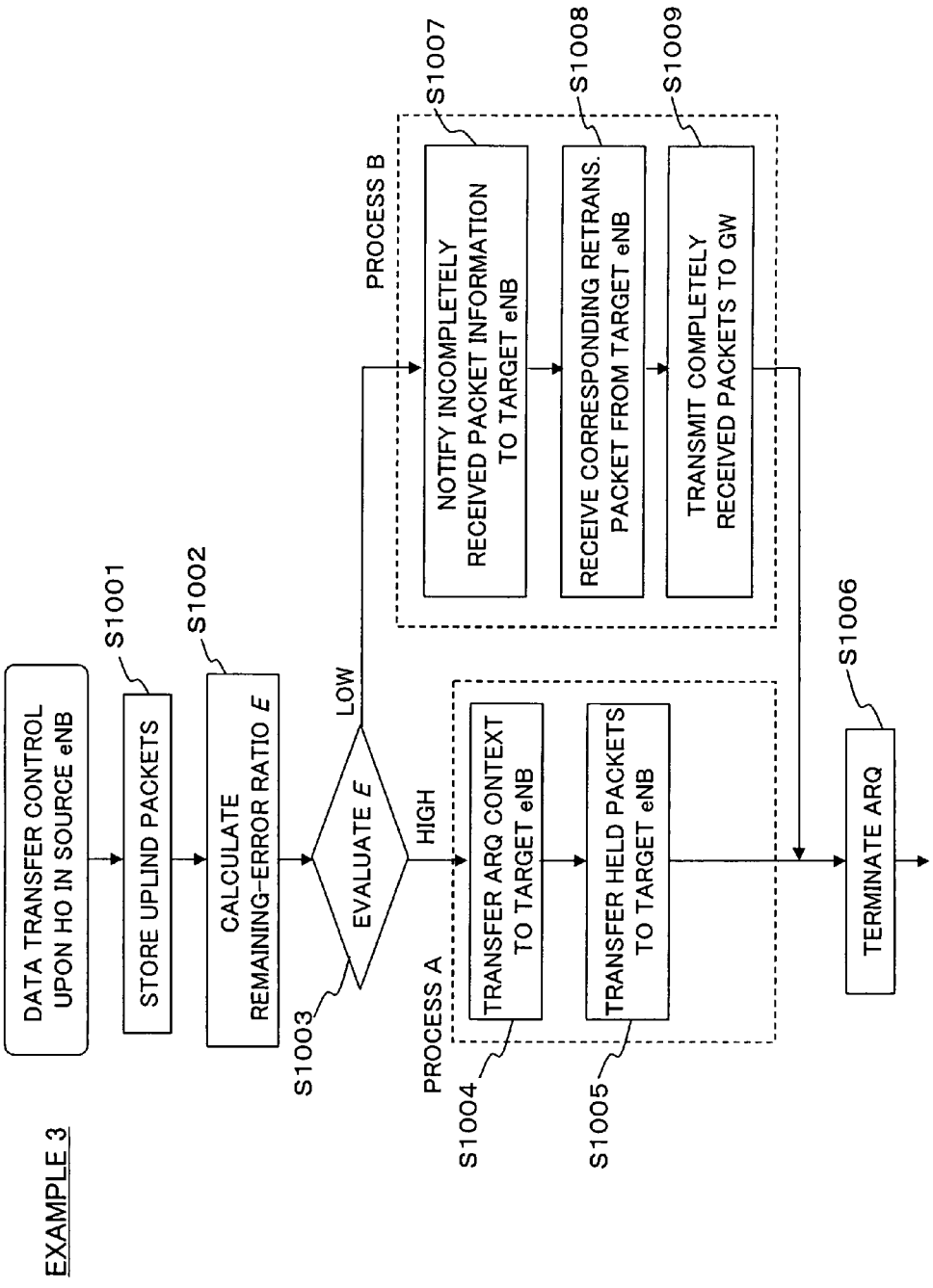
FIG. 13 is a flow chart showing the control performed by a source base station in a mobile communications system according to a third example of the present invention.

FIG. 13 is a flow chart showing the control performed by a source base station in a mobile communications system according to the third example of the present invention. According to the present example, it is determined whether or not to perform the reverse transfer of a retransmission packet from the target base station eNB2 to the source base station eNB1, based on the proportion or ratio of the incompletely received packets held by the source base station eNB1, with consideration given to the capacities and load states of the base stations eNB and network.

Referring to FIG. 13, it is assumed that when the handover controller 404 of the source base station eNB1 decides a handover for the mobile station UE, a series of uplink packets received from the mobile station UE have been stored in the buffer section 401, with some incompletely received packets among the received packets (step S1001).

First, the ARQ processor 405 calculates a remaining-error ratio E from the series of uplink packets stored in the buffer section 401 (step S1002). Any calculation method can be used to calculate the remaining-error ratio E. For example, assuming that k packets are incompletely received packets among N uplink packets, the remaining-error ratio E can be calculated as E=k/N. Alternatively, the number of incompletely received packets, k, can also be used as it is in place of the remaining-error ratio E.

When the remaining-error ratio E is obtained, the control section 403, based on the remaining-error ratio E, determines which of the forward transfer control (process A) and the reverse transfer control (process B) to perform (step S1003). The transfer control can be determined by comparing the remaining-error ratio E with a predetermined threshold value. It is possible to set a single threshold value or a plurality of threshold values, depending on the usable bandwidth of the interface XUB between the base stations. As a general reference point, either the forward transfer control (process A) or the reverse transfer control (process B) is determined so that the amount of data transfer between the base stations becomes smaller.

When the remaining-error ratio E is higher than the predetermined threshold value (high remaining-error ratio), the ARQ processor 405 of the source base station eNB1 transfers an ARQ context and the stored uplink packets to the target base station eNB2 (steps S1004 and S1005) and then terminates the ARQ process (step S1006). The details thereof will be described later.

When the remaining-error ratio E is not higher the predetermined threshold value (low remaining-error-ratio), the ARQ processor 405 of the source base station eNB1 notifies the target base station eNB2 of information about the incompletely received packets (for example, their sequence numbers) (step S1007), and waits for the receipt of the retransmission packets (reverse transfer) from the target base station eNB2. When the source base station eNB1 receives the retransmission packets corresponding to the incompletely received packets from the target base station eNB2 (step S1008), the source base station eNB1 transmits a series of the completely received packets to the gateway GW (step S1009). When the source base station eNB1 finishes transmitting all the stored packets related to the mobile station UE, the source base station eNB1 terminates the ARQ process (step S1006).

As to the reverse transfer control (process B), the above-descried reverse transfer control according to the first or second example can be used, and therefore the description thereof will be omitted. Hereinafter, the forward transfer control (process A) will be described in detail.

Figure 14:
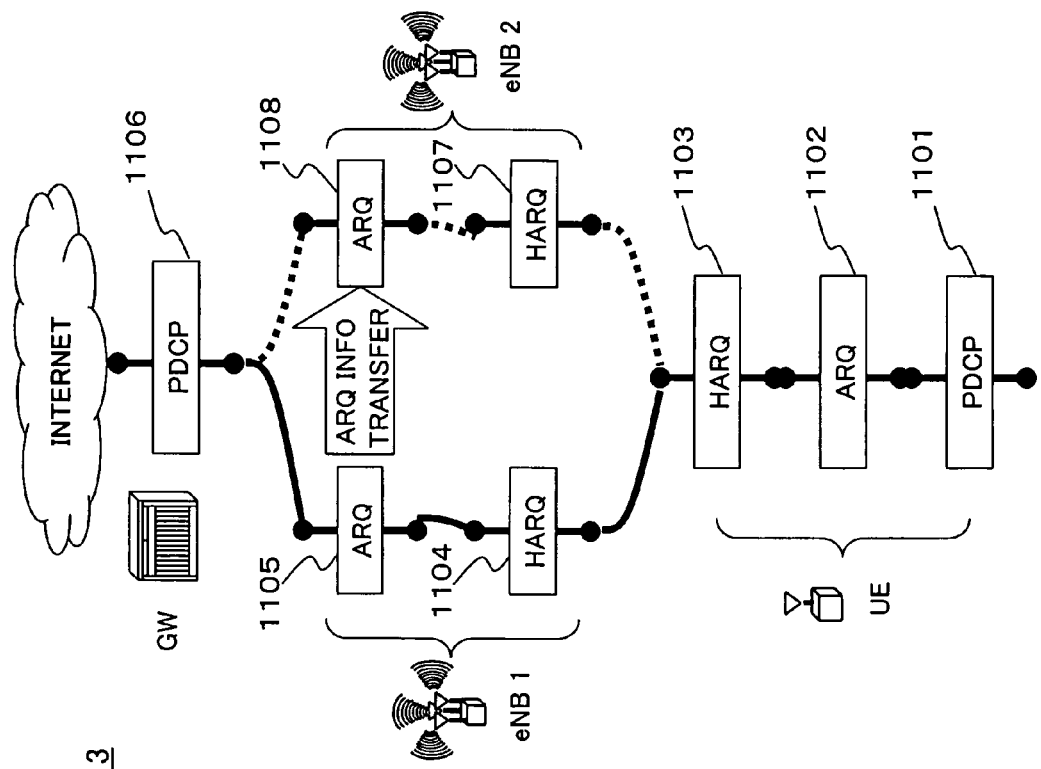
FIG. 14 is a diagram of a protocol structure of the mobile communications system at the time of forward transfer control (process A) according to the third example of the present invention.
Figure 15:
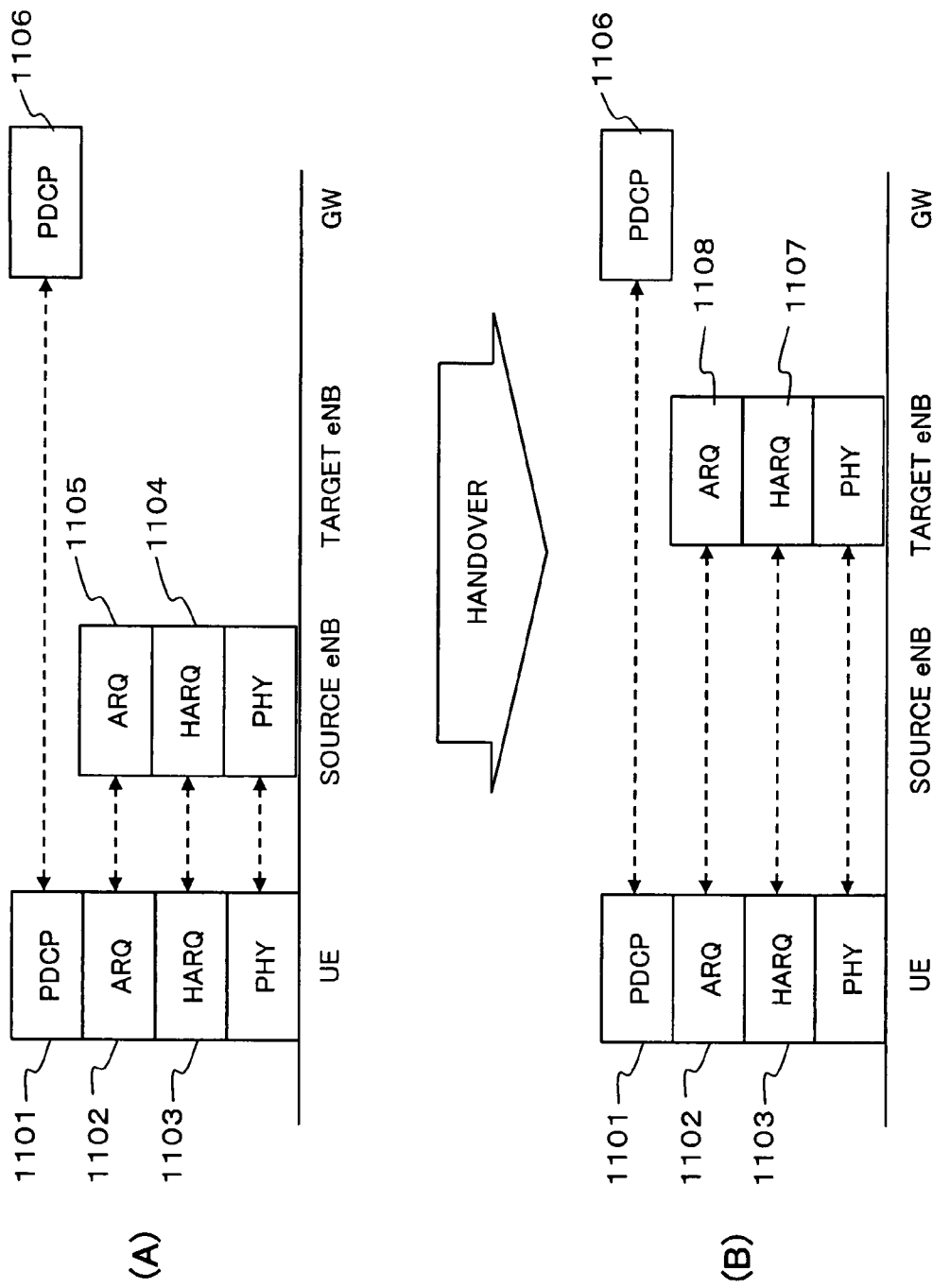
FIG. 15 is a diagram showing protocol correspondences among a mobile station, base stations, and a gateway shown in FIG. 14.

FIG. 14 is a diagram of a protocol structure of the mobile communications system during the forward transfer control (process A) in the third example. FIG. 15 is a diagram showing the protocol correspondences among the mobile station, base stations, and gateway. The protocols used here, related to the forward transfer control, are HARQ and ARQ. Note that in the present embodiment as well, the error correction functionality is not limited to the ARQ/HARQ protocol stack.

Referring to FIGS. 14 and 15, error correction is carried out through HARQ 1103 at the mobile station UE and HARQ 1104 at the source base station eNB1. If an error still remains even after this HARQ process, error correction by means of packet retransmission is further carried out through ARQ 1102 at the mobile station UE and ARQ 1105 at the source base station eNB1. In addition, PDCP 1101 at the mobile station UE is initiated based on PDCP 1106 at the gateway GW.

Subsequently, when a handover is started, the source base station eNB1 transfers the stored uplink packets and ARQ information to the target base station eNB2 and then terminates ARQ 1105. When the mobile station UE has connected to the target base station eNB2, the target base station eNB2 starts an ARQ process in accordance with the transferred ARQ information and, when completely receiving the retransmission packets and subsequent new packets from the mobile station UE, sequentially transmits them to the gateway GW.

10.3) Uplink Data Transmission Under Forward Transfer Control

Figure 16:
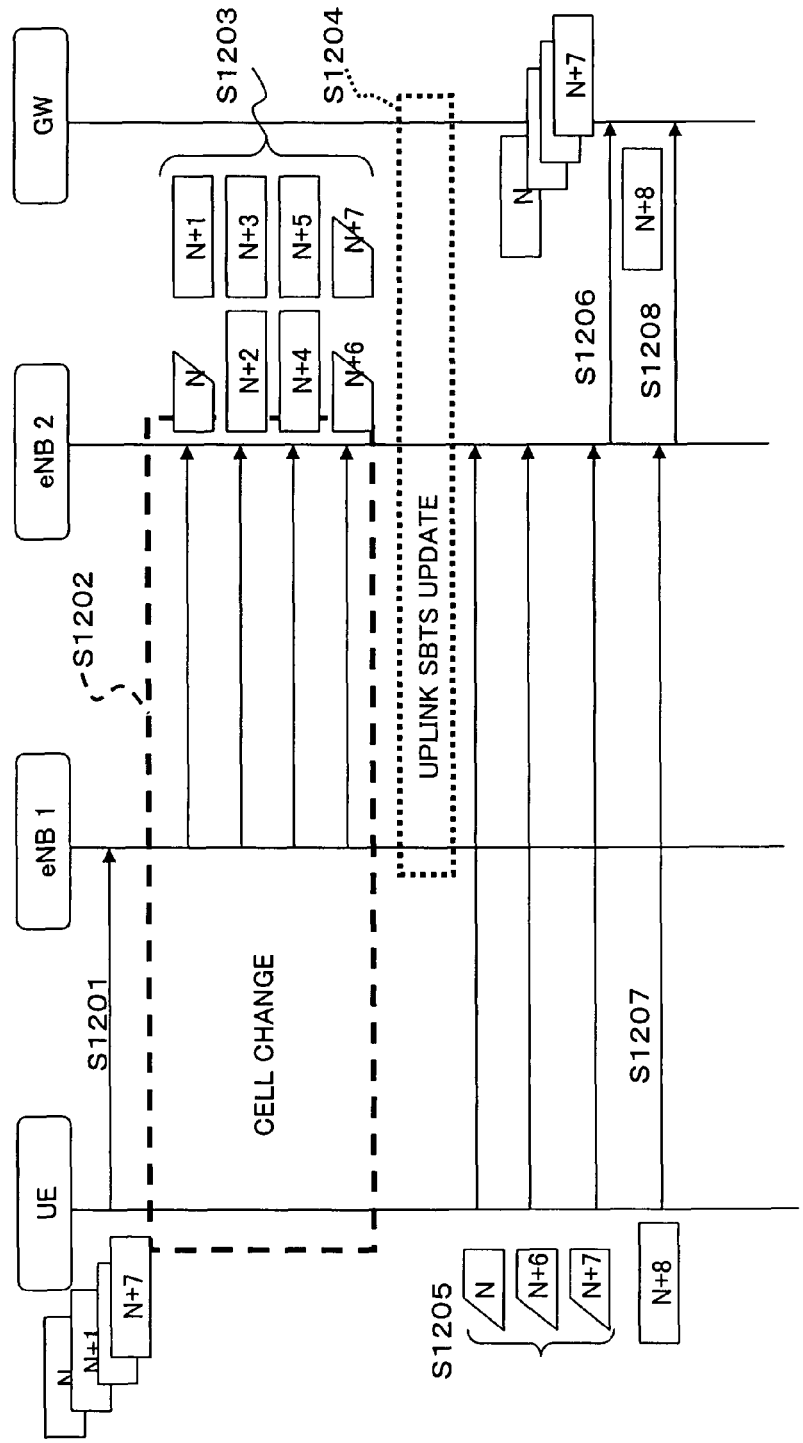
FIG. 16 is a sequence diagram showing a procedure of uplink data transmission during the forward transfer control (process A) according to the third example of the present invention.

FIG. 16 is a sequence diagram showing a procedure of uplink data transmission during the forward transfer control (process A) in to the third example of the present invention. It is assumed that the above-described protocol control shown in FIGS. 14 and 15 is carried out here.

First, the mobile station UE transmits data packets D(N), ..., D(N+7) to the source base station eNB1 (S1201). Not all the packets can be completely received by the source base station eNB1, and it is assumed hereinafter that the data packets D*(N), D*(N+6), and D*(N+7) are incompletely received packets. In this case, the control section 403 of the source base station eNB1 presents a reception status report to the mobile station UE and stores these uplink data packets D*(N) to D*(N+7) in the buffer section 401 until the packets corresponding to the incompletely received packets are sequentially retransmitted from the mobile station UE and all become completely received packets.

At this point in time, it is assumed that the handover controller 505 of the mobile station UE determines that a handover is needed and sends the source base station eNB1 a request for a handover to the target base station eNB2. At this request, the handover controllers 404 of the source base station eNB1 and target base station eNB2 carry out mutual adjustment for the handover for the mobile station UE and start handover control (S1202). In this event, the ARQ processor 405 of the source base station eNB1 transfers the uplink packets D*(N) to D*(N+7) and ARQ information to the target base station eNB2 and terminates ARQ 1105 (S1203).

When the mobile station UE has connected to the target base station eNB2 and the serving base station (SBTS) of the mobile station UE is updated to the target base station eNB2 (S1204), then the ARQ processor 405 of the serving base station eNB2 presents the reception status report to the mobile station UE, and the packets corresponding to the incompletely received packets are sequentially retransmitted from the mobile station UE (S1205). Thus, the ARQ processor 405 of the serving base station eNB2 transmits the completely received packets D(N) to D(N+7) to the gateway GW (S1206). Thereafter, when completely receiving a new uplink packet D(N+8) from the mobile station UE (S1207), the serving base station eNB2 transmits it to the gateway GW (S1208).

10.4) Effects

As described above, it is determined which of the forward data transfer (process A) and the reverse transfer of a retransmission packet from the target base station eNB2 to the source base station eNB1 (process B) to perform, by using the proportion of the incompletely received packets held by the source base station eNB1 and the predetermine threshold value determined with consideration given to the capacities and load states of the base stations and network. Thereby, it is possible to avoid a situation where the amount of traffic between the base stations is unnecessarily increased.

Moreover, the control of switching between the forward transfer control and the reverse transfer control is performed by the source base station eNB1. Therefore, for example, even if a communication path between the source base station eNB1 and the gateway GW is disabled due to some failure, it is possible to maintain their communications by switching to the forward transfer control.

11. Fourth Example

11.1) Network Architecture

Figure 17:
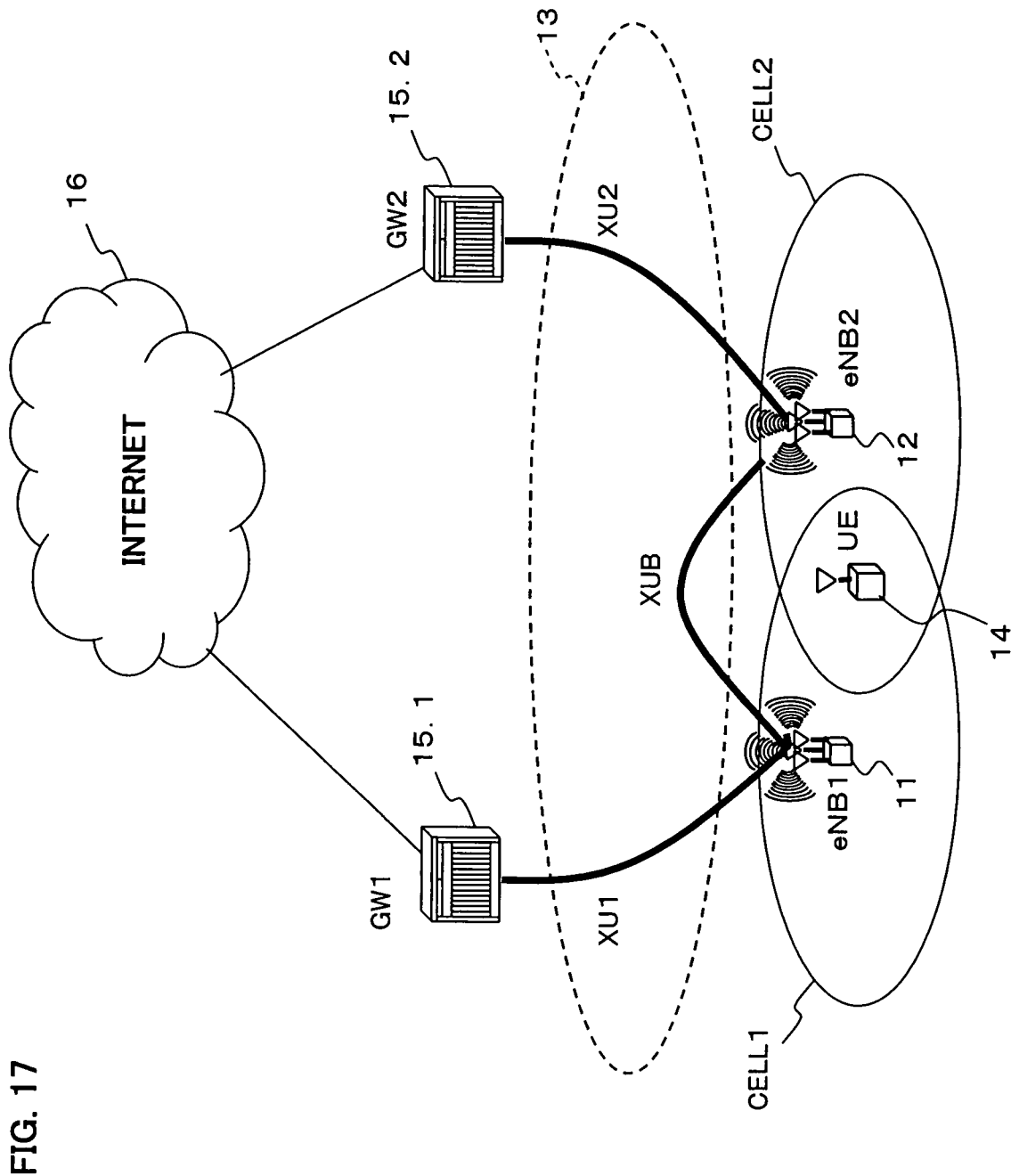
FIG. 17 is a diagram schematically showing a network architecture II of a mobile communications system.

FIG. 17 is a diagram schematically showing a network architecture II of a mobile communications system. Here, to simplify the description, it is assumed that base stations 11 and 12 (eNB1 and eNB2, respectively) are connected to different gateways 15.1 and 15.2 (GW1 and GW2, respectively), respectively, through a network 13, and that with the base station 11 as its source base station, a mobile station 14 (UE) is moving from a cell 1 of the source base station 11 to a cell 2 of the target base station 12. At this time, the gateway 15.1 to which the source base station 11 gains access is referred to as a source gateway, and the gateway 15.2 to which the target base station 12 gains access is referred to as a target gateway. The mobile station 14 transmits and receives data packets to/from the Internet 16 through the network 13.

Hereinafter, it is assumed that communications between the base stations are carried out through an interface XUB, that communications between the base station 11 and the gateway 15.1 are carried out through an interface XU1, and that communications between the base station 12 and the gateway 15.2 are carried out through an interface XU2. A fourth example of the present invention is an application of the first exemplary embodiment of the present invention to the network architecture II.

11.2) Protocol Control

Figure 18:
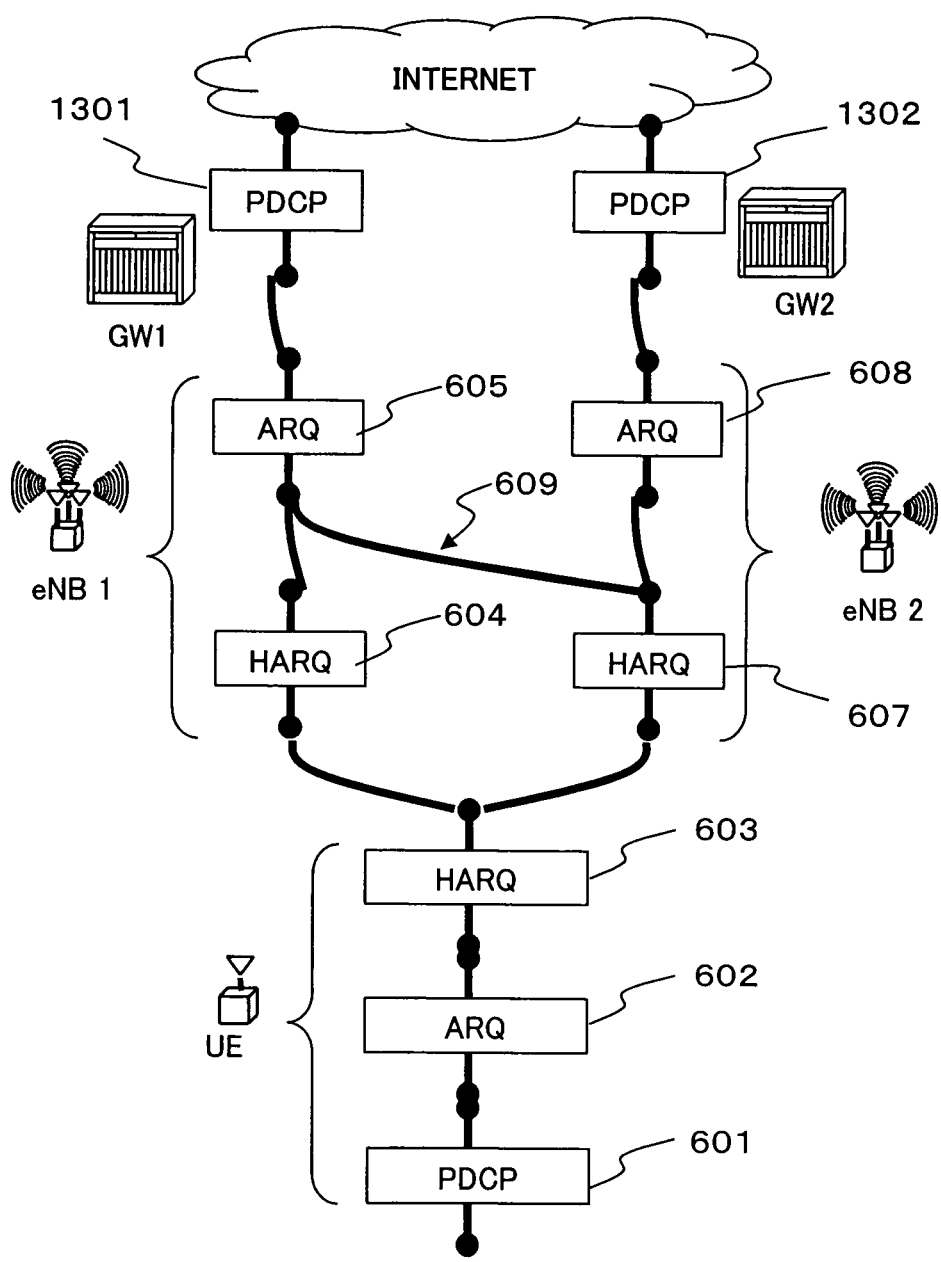
FIG. 18 is a diagram of a protocol structure of a mobile communications system according to a fourth example of the present invention.
Figure 19:
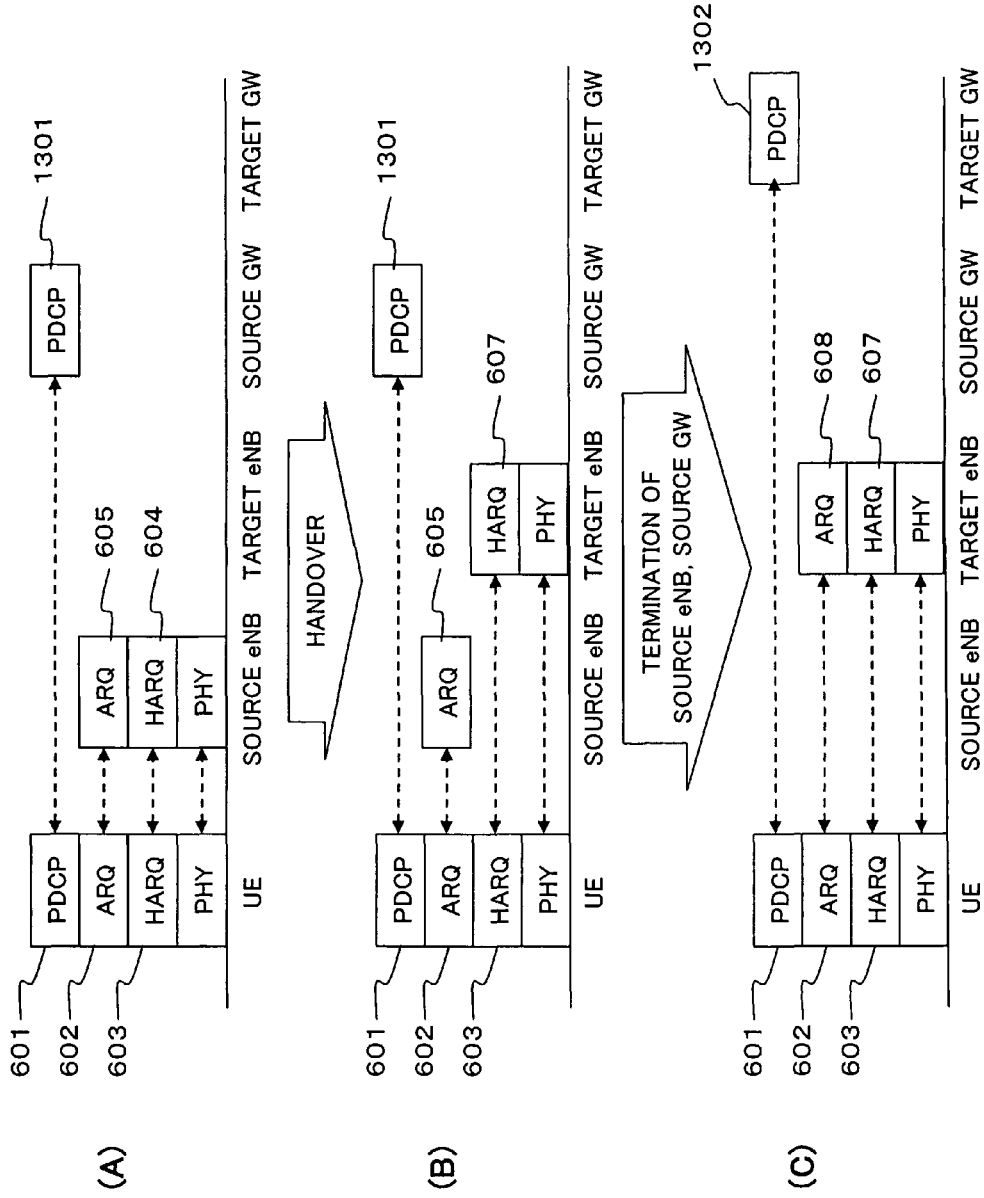
FIG. 19 is a diagram showing protocol correspondences among a mobile station, base stations, and gateways according to the fourth example shown in FIG. 18.

FIG. 18 is a diagram of a protocol structure of a mobile communications system according to the fourth example. FIG. 19 is a diagram showing the protocol correspondences among the mobile station, base stations, and gateways in the fourth example. The protocols used in the present example, related to the retransmission and reverse transfer control, are as follows.

HARQ (Hybrid ARQ) is a retransmission protocol in a layer 1, including an error correction coding (FEC) function, and renders retransmission control based on an ACK/NACK feedback from the receiving side.

ARQ (Automatic Repeat reQuest) is an error correction protocol, rendering the control of retransmitting the data packet corresponding to a data packet containing an error, to correct the error. In the present example, when an error still remains despite the error correction function in the lower layer (here, HARQ process), error correction is carried out by retransmitting the data packet corresponding to the one containing the error.

In addition, PDCP (Packet Data Convergence Protocol) is a protocol rendering the compression of an IP header, encoding of an IP packet, and the like and is present at each of the gateways GW1 and GW2 in the present example. PHY (PHYsical layer protocol) is a protocol here related to radio communications between a mobile station and a base station.

Note that although the two-layer ARQ/HARQ protocol stack is used for the error correction functionality in the present embodiment, the error correction functionality is not limited to this protocol structure.

Referring to FIGS. 18 and 19, error correction is carried out through HARQ 603 at the mobile station UE and HARQ 604 at the source base station eNB1. If an error still remains even after this HARQ process, error correction by means of packet retransmission is further carried out through ARQ 602 at the mobile station UE and ARQ 605 at the source base station eNB1.

Subsequently, when a handover is decided, the source base station eNB1 notifies the target base station eNB2 of information about a packet that needs to be retransmitted. However, the source base station eNB1 does not clear but maintains ARQ 605.

The target base station eNB2 is notified of the information about a packet that needs to be retransmitted, and the mobile station UE connects to the cell of the target base station eNB2, whereby the target base station eNB2 requests the target gateway GW2 to initiate PDCP 1302. Moreover, when the target base station eNB2 receives the retransmission packet from the mobile station UE in accordance with a HARQ process between HARQ 607 at itself and HARQ 603 at the mobile station UE, the target base station eNB2 transfers it to the source base station eNB1 through a reverse transfer route 609.

Since ARQ 605 at the source base station eNB1 is maintained, upon receipt of the retransmission packet through the reverse transfer route 609, the source base station eNB1 can carry out the ARQ process and transmit the completely received packets to the source gateway GW1.

When all retransmission packets have been completely delivered to the source base station eNB1, the target base station eNB2 requests the target gateway GW2 to switch the path. At the same time, the source base station eNB1 terminates ARQ 605 at itself if no uplink packet to transmit to the source gateway GW1 remains.

The target gateway GW2 then has the source gateway GW1 terminate PDCP 1301 and starts processing as the serving gateway of the mobile station UE.

The target base station eNB2 sends a request to resume uplink transmission to the mobile station UE, thereby generating an ARQ process between ARQ 608 at itself and ARQ 602 at the mobile station UE. The mobile station UE starts transmitting new packets to the target base station eNB2.

When the switching of the path is completed and the uplink packets are completely received, then the target base station eNB2 delivers these completely received uplink packets to the serving gateway GW2.

11.3) Uplink Data Transmission

Figure 20:
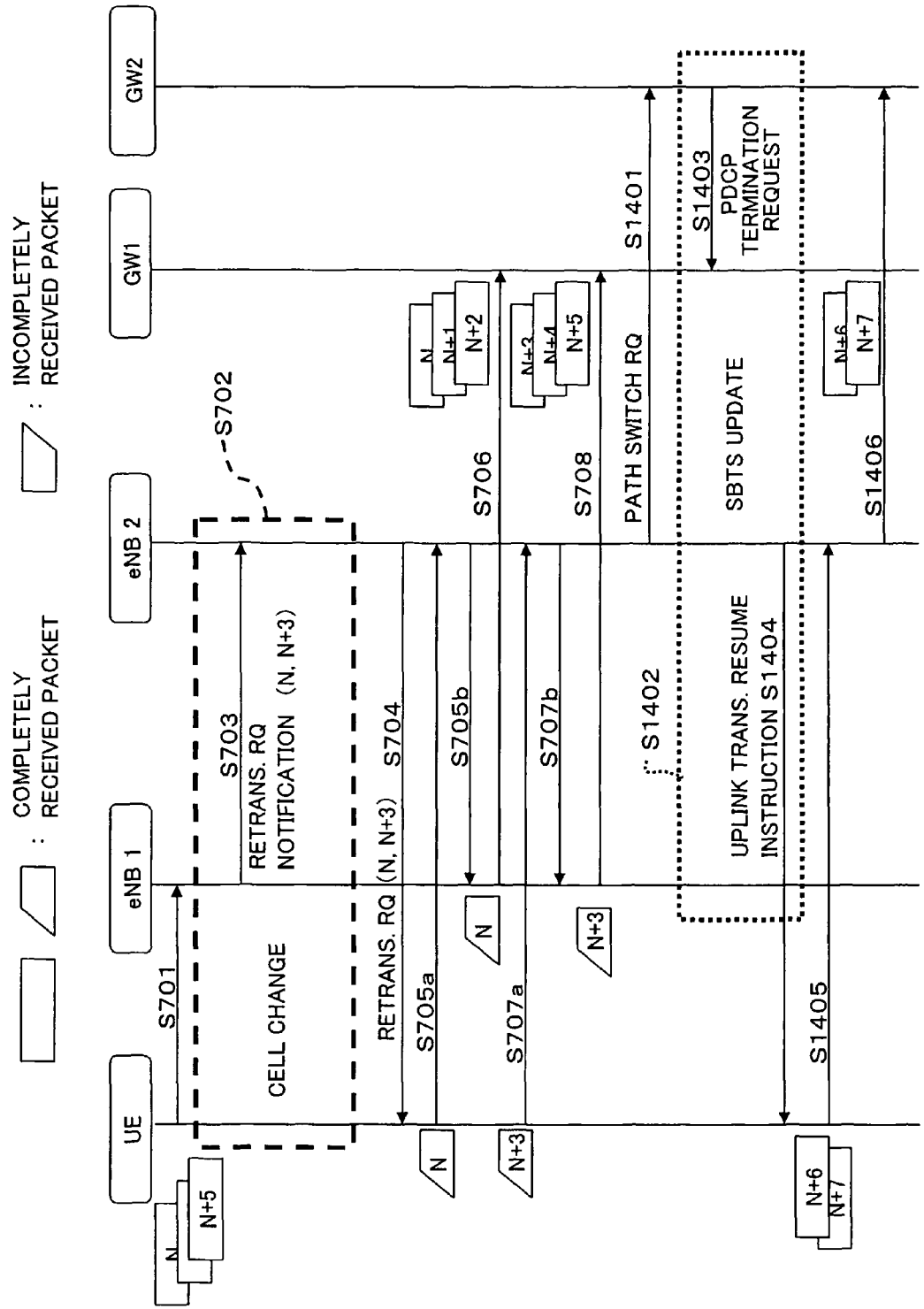
FIG. 20 is a sequence diagram showing a procedure of uplink data transmission at the time of handover according to the fourth example of the present invention.

FIG. 20 is a sequence diagram showing a procedure of uplink data transmission during handover according to the fourth example of the present invention. It is assumed that the protocol control shown in FIGS. 18 and 19 is carried out here.

First, the mobile station UE transmits data packets D(N), . . . , D(N+5) to the source base station eNB1 (S701). Not all the packets can be completely received by the source base station eNB1, and it is assumed hereinafter that the data packets D*(N) and D*(N+3) are incompletely received packets. In this case, the control section 403 of the source base station eNB1 presents a reception status report to the mobile station UE and stores these uplink data packets D*(N) to D(N+5) in the buffer section 401 until the packets corresponding to the incompletely received packets are sequentially retransmitted from the mobile station UE and all become completely received packets.

At this point in time, it is assumed that the handover controller 505 of the mobile station UE determines that a handover is needed and sends the source base station eNB1 a request for a handover to the target base station eNB2. At this request, the handover controllers 404 of the source base station eNB1 and target base station eNB2 carry out mutual adjustment for the handover for the mobile station UE and start handover control (S702). In this event, the ARQ processor 405 of the source base station eNB1 notifies the target base station eNB2 of the sequence numbers (here, "N" and "N+3") of the incompletely received packets that need to be retransmitted (S703).

When the mobile station UE has connected to the target base station eNB2, the ARQ processor 405 of the target base station eNB2 provides the mobile station UE with the sequence numbers "N" and "N+3" of the incompletely received packets that need to be retransmitted (S704). When the ARQ processor 506 of the mobile station UE transmits the retransmission packet D(N) to the target base station eNB2 in response (S705a), the control section 403 of the target base station eNB2 reversely transfers the retransmission packet D(N) to the source base station eNB1 (S705b). Upon receipt of the retransmission packet D(N), the source base station eNB1 transmits the completely received packets D(N) to D(N+2) to the source gateway GW1 (S706).

Similarly, when the mobile station UE transmits the retransmission packet D(N+3) to the target base station eNB2 (S707a), the control section 403 of the target base station eNB2 reversely transfers the retransmission packet D(N+3) to the source base station eNB1 (S707b). Upon receipt of the retransmission packet D(N+3), the source base station eNB1 transmits the completely received packets D(N+3) to D(N+5) to the source gateway GW1 (S708). All the untransmitted packets D(N) to D(N+5) have been completely transmitted to the source gateway GW1, whereby the ARQ processor 405 of the source base station eNB1 can terminates the ARQ process.

When the target base station eNB2 has completely transferred all the retransmission packets (here, D(N) and D(N+3)) to the source base station eNB1, the handover controller 404 of the target base station eNB2 requests the target gateway GW2 to switch the path (S1401), whereby the serving base station (SBTS) of the mobile station UE is updated (S1402). At this time, the target gateway GW2 notifies the source gateway GW1 that the source gateway GW1 can terminate PDCP (S1403). Upon this notification, the source gateway GW1 terminates its own PDCP, and the target gateway GW2 starts processing as the serving gateway of the mobile station UE.

The base station eNB2, which has become the serving base station of the mobile station UE, sets a new ARQ process with the mobile station UE by sending the mobile station UE a request to resume uplink transmission (S1404). In response to this, the mobile station UE transmits new uplink packets D(N+6) and D(N+7) to the serving base station eNB2 (S1405) If the packets are completely received, the serving base station eNB2 transmits these new packets to the gateway GW2, which has become the serving gateway (S1406).

11.4) Effects

As described above, according to the fourth example of the present invention, retransmission packets are reversely transferred from the target base station eNB2 to the source base station eNB1, and then packets, as a series of completely received packets, are transmitted from the source base station eNB1 to the source gateway GW1. Moreover, a series of new uplink packets are transmitted from the target base station eNB2 to the target gateway GW2.

As described above, the first example of the present invention can also be applied to the network architecture II in which the base stations eNB1 and eNB2 are connected to the different gateways GW1 and GW2, respectively. That is, the present example also has the effect that, as mentioned above, the amount of traffic between the base stations can be reduced in comparison with the forward transfer scheme by which all the uplink packets held by the source base station eNB1 are transferred to the target base station eNB2, and as a result, it is possible to achieve higher-speed uplink data transmission and a reduction in the duration of a communication interruption. The present invention exhibits greater effects in particular as the proportion of the incompletely received packets held by the source base station eNB1 becomes smaller, because the amount of packet transfer between the base stations is reduced.

Note that although a packet is used as a unit of retransmission performed through ARQ in the present example, the unit may be a transmission unit included in a packet or may be a data unit. For example, when the mobile station UE transmits one uplink packet D(N) to the source base station eNB1, the mobile station UE disassembles the packet into a plurality of parts and transmits each part to the source base station eNB1. In this case, there are some occasions when some of the parts are successfully received by the source base station eNB1 while the other parts result in error. Accordingly, the source base station eNB1 notifies the target base station eNB2 of information specifying the parts in error, and the target base station eNB2 sends a request for retransmission to the mobile station UE, whereby only the parts in error can be reversely transferred from the target base station eNB2 to the source base station eNB1. Since the parts in error only are retransmitted, the amount of data transfer between the base stations can be further reduced.

12. Fifth Example 12.1) Network Architecture

A fifth example of the present invention is an application of the second exemplary embodiment of the present invention to the network architecture II shown in FIG. 17.

12.2) Protocol Control

Figure 21:
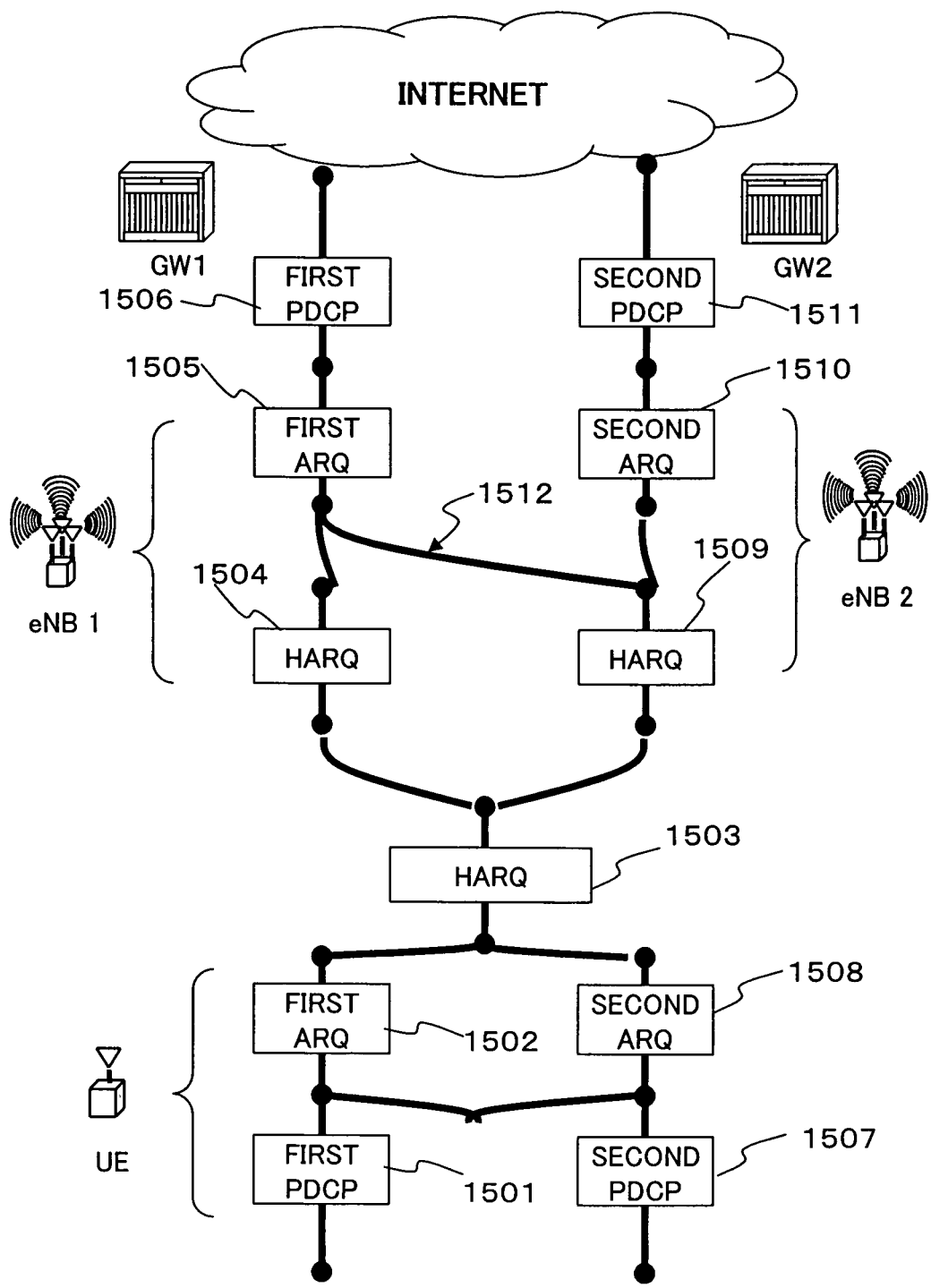
FIG. 21 is a diagram of a protocol structure of a mobile communications system according to a fifth example of the present invention.
Figure 22:
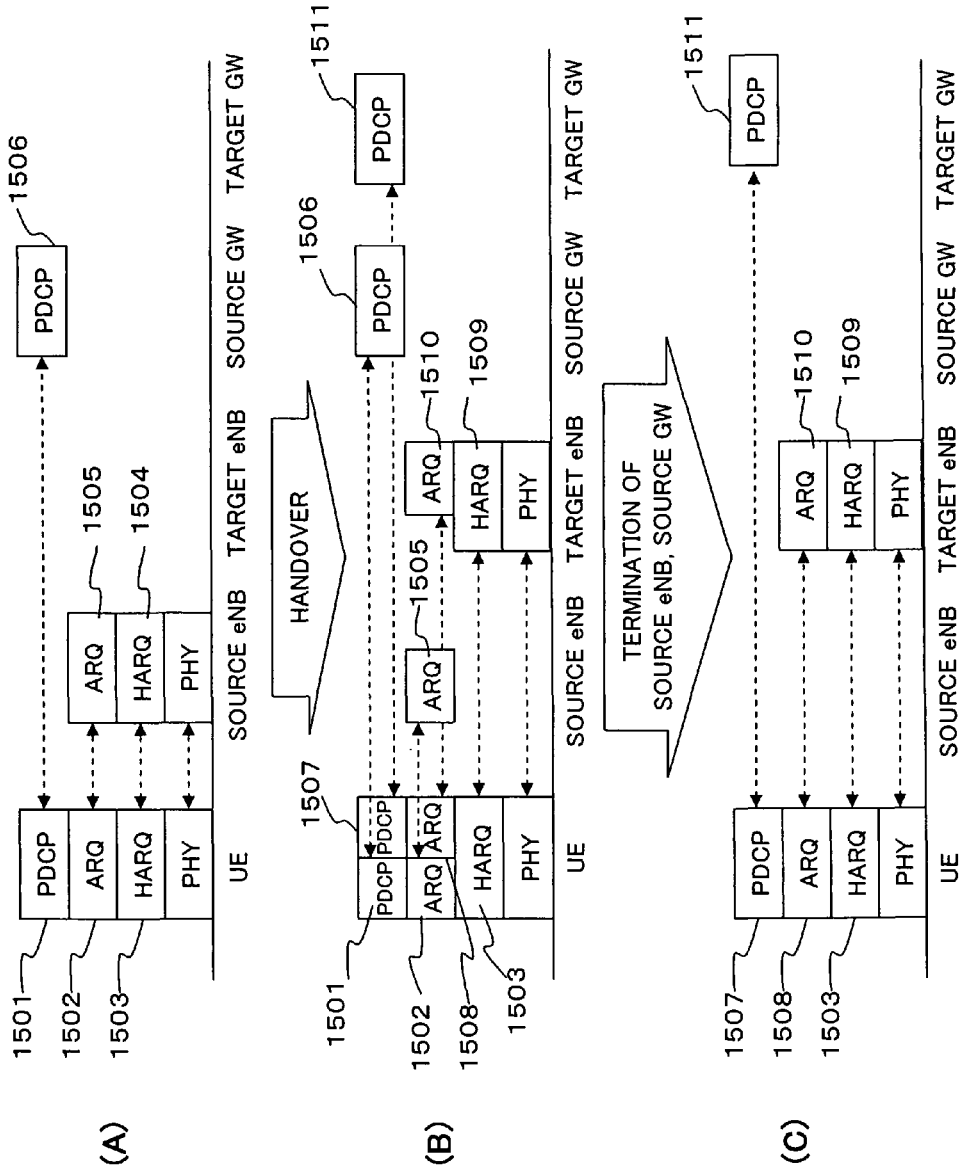
FIG. 22 is a diagram showing protocol correspondences among a mobile station, base stations, and gateways according to the fifth example shown in FIG. 21.

FIG. 21 is a diagram of a protocol structure of a mobile communications system according to the fifth example. FIG. 22 is a diagram showing the protocol correspondences among the mobile station, base stations, and gateways in the fifth example. The protocols used in the present embodiment, related to the retransmission and reverse transfer control, are as follows.

HARQ (Hybrid ARQ) is a retransmission protocol in a layer 1, including an error correction coding (FEC) function, and renders retransmission control based on an ACK/NACK feedback from the receiving side.

ARQ (Automatic Repeat reQuest) is an error correction protocol, rendering the control of retransmitting the data packet corresponding to a data packet containing an error, to correct the error. In the present embodiment, when an error still remains despite the error correction function in the lower layer (here, HARQ process), error correction is carried out by retransmitting the data packet corresponding to the one containing the error.

In addition, PDCP (Packet Data Convergence Protocol) is a protocol rendering the compression of an IP header, encoding of an IP packet, and the like and is present at each of the gateways GW1 and GW2 in the present embodiment.

Note that although the two-layer ARQ/HARQ protocol stack is used for the error correction functionality in the present embodiment, the error correction functionality is not limited to this protocol structure. The present invention can be applied to any system in which a data unit to be received in the ARQ control may contain an error.

Referring to FIGS. 21 and 22, error correction is carried out through HARQ 1503 at the mobile station UE and HARQ 1504 at the source base station eNB1. If an error still remains even after this HARQ process, error correction by means of packet retransmission is further carried out through ARQ 1502 at the mobile station UE and ARQ 1505 at the source base station eNB1. In addition, PDCP 1501 at the mobile station UE is set based on PDCP 1506 at the source gateway GW1.

Subsequently, when a handover is decided, the source base station eNB1 notifies the target base station eNB2 of information about a packet that needs to be retransmitted. However, the source base station eNB1 does not clear but maintains ARQ 1505. Further, the target base station eNB2 requests the target gateway GW2 to initiate new second PDCP 1511. To this request, the target gateway GW2 responds with an initial parameter setting value for PDCP 1507 at the mobile station UE.

When the mobile station UE has connected to the cell of the target base station eNB2, the target base station eNB2 presents a request for retransmission to the mobile station UE by using the information about the packet that needs to be retransmitted, and further starts a second ARQ process for transmission of new packets, between second ARQ 1510 at itself and second ARQ 1508 at the mobile station UE. Then, the target base station eNB2 requests the mobile station UE to start a second PDCP process based on the setting made by the target gateway GW2. Thus, the mobile station UE preferentially transmits the data packet that can end the first ARQ process with the source base station eNB1 and the first PDCP process with the source gateway GW1, that is to say the retransmission packet.

When receiving the retransmission packet from the mobile station UE, the target base station eNB2 transfers it to the source base station eNB1 through a reverse transfer route 1512. Since ARQ 1505 at the source base station eNB1 is maintained, upon receipt of the retransmission packet through the reverse transfer route 1512, the source base station eNB1 carries out the ARQ process and transmits completely received data packets to the source gateway GW1.

In parallel with the transmission of the retransmission packet through the reverse transfer route 1512, the mobile station UE transmits new packets to the target base station eNB2 by using the process between the second ARQs 1508 and 1510 and the process between the second PDCPs 1507 and 1511, and the target base station eNB2 stores those packets.

When all retransmission packets have been completely transferred to the source base station eNB1, the target base station eNB2 requests the target gateway GW2 to switch the path. At the same time, the source base station eNB1 terminates the first ARQ process if there is no data packet to transmit to the source gateway GW1.

The target gateway GW2 requests that the source gateway GW1 terminate PDCP 1506. At this request, the source gateway GW1 terminates PDCP 1506, and the target gateway GW2 starts processing as the serving gateway of the mobile station UE.

When the switching of paths is completed, the target base station eNB2 delivers the completely received packets, stored in the second ARQ and PDCP processes, to the serving gateway GW2.

12.3) Uplink Data Transmission

Figure 23:
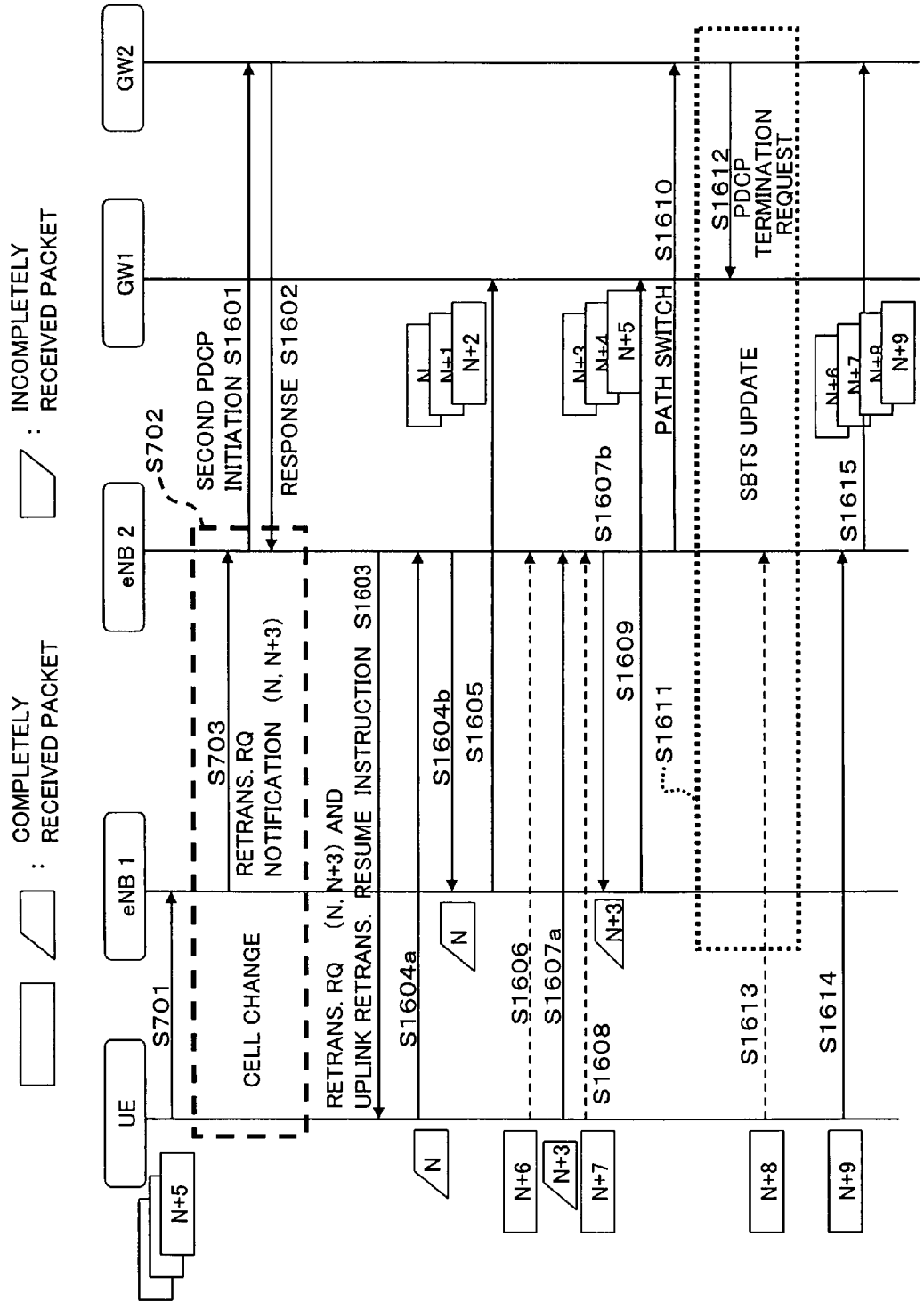
FIG. 23 is a sequence diagram showing a procedure of uplink data transmission at the time of handover according to the fifth example of the present invention.

FIG. 23 is a sequence diagram showing a procedure of uplink data transmission during handover according to the fifth example of the present invention. It is assumed that the above-described protocol control shown in FIGS. 21 and 22 is carried out here.

First, the mobile station UE transmits data packets D(N), . . . , D(N+5) to the source base station eNB1 (S701). Not all the packets can be completely received by the source base station eNB1, and it is assumed hereinafter that the data packets D*(N) and D*(N+3) are incompletely received packets. In this case, the control section 403 of the source base station eNB1 presents a reception status report to the mobile station UE and stores these uplink data packets D*(N) to D(N+5) in the buffer section 401 until the packets corresponding to the incompletely received packets are sequentially retransmitted from the mobile station UE and all become completely received packets.

At this point in time, it is assumed that the handover controller 505 of the mobile station UE determines that a handover is needed and sends the source base station eNB1 a request for a handover to the target base station eNB2. At this request, the handover controllers 404 of the source base station eNB1 and target base station eNB2 carry out mutual adjustment for the handover for the mobile station UE and start handover control (S702). In this event, the ARQ processor 405 of the source base station eNB1 notifies the target base station eNB2 of the sequence numbers (here, "N" and "N+3") of the incompletely received packets that need to be retransmitted (S703). In addition, the target base station eNB2 requests the target gateway GW2 to initiate new second PDCP (S1601). To this request, the target gateway GW2 responds with an initial parameter setting value for PDCP at the mobile station UE (S1602).

When the mobile station UE has connected to the target base station eNB2, the ARQ processor 405 of the target base station eNB2 provides the mobile station UE with the sequence numbers N and N+3 of the incompletely received packets that need to be retransmitted, and also sends the mobile station UE an instruction to resume uplink transmission by using the initial parameter setting value received from the target gateway GW2 (S1603).

When the ARQ processor 506 of the mobile station UE transmits the retransmission packet D(N) to the target base station eNB2 in response (S1604a), the control section 403 of the target base station eNB2 reversely transfers the retransmission packet D(N) to the source base station eNB1 (S1604b). Upon receipt of the retransmission packet D(N), the source base station eNB1 transmits the completely received packets D(N) to D(N+2) to the source gateway GW1 (S1605).

In parallel with this process, since the mobile station UE has been given the instruction to resume uplink transmission from the target base station eNB2, the mobile station UE transmits a new uplink packet D(N+6), if it is present, to the target base station eNB2 (S1606). Moreover, when the mobile station UE transmits the retransmission packet D(N+3) to the target base station eNB2 (S1607a), the control section 403 of the target base station eNB2 reversely transfers the retransmission packet D(N+3) to the source base station eNB1 (S1607b). During this period, if there is a new uplink packet D(N+7), the mobile station UE transmits it to the target base station eNB2 (S1608). Upon receipt of the retransmission packet D(N+3), the source base station eNB1 transmits the completely received packets D(N+3) to (D+5) to the source gateway 1 (S1609).

When all the untransmitted packets D(N) to D(N+5) have been transmitted in this manner, the handover controller 404 of the target base station eNB2 requests the target gateway GW2 to switch the path (S1610), whereby the serving base station (SBTS) of the mobile station UE is updated (S1611). The target gateway GW2 has the source gateway GW1 terminate PDCP (S1612), thereby becoming the serving gateway. Even during this period, if there is a new uplink packet D(N+8), the mobile station UE can transmit it to the target base station eNB2 (S1613). In this manner, when the update of the serving base station is completed, the mobile station UE transmits a new packet D(N+9) to the serving base station eNB2 (S1614). The packets D(N+6) to D(N+9) held by the serving base station eNB2, if completely received, are then transmitted to the gateway GW2 (S1615).

12.4) Effects

As described above, according to the fifth example of the present invention, retransmission packets are reversely transferred from the target base station eNB2 to the source base station eNB1, and then packets, as a series of completely received packets, are transmitted from the source base station eNB1 to the source gateway GW1. In parallel with this, the mobile station UE can transmit new uplink packets to the target base station eNB2.

As described above, the second exemplary embodiment of the present invention can also be applied to the network architecture II in which the base stations eNB1 and eNB2 are connected to the different gateways GW1 and GW2, respectively. That is, the present example also has the effect that, as mentioned above, the amount of traffic between the base stations can be reduced in comparison with the forward transfer scheme by which all the uplink packets held by the source base station eNB1 are transferred to the target base station eNB2, and as a result, it is possible to achieve higher-speed uplink data transmission and a reduction in the duration of a communication interruption. The present example exhibits greater effects in particular as the proportion of the incompletely received packets held by the source base station eNB1 becomes smaller, because the amount of packet transfer between the base stations is reduced.

In addition, according to the fifth example, the second ARQ process is set between the mobile station UE and the target base station eNB2, and the second PDCP process is set between the mobile station UE and the target gateway GW2, whereby the mobile station UE can transmit a new uplink packet to the target base station eNB2 in parallel with the transmission/retransmission of a packet using the first ARQ process with the source base station eNB1 and the first PDCP process with the source gateway GW1. Accordingly, since the mobile station UE can transmit subsequent uplink packets to the target base station eNB2 without waiting until the first ARQ process with the source base station eNB1 is terminated, it is possible to further reduce the duration of a communication interruption.

Note that although a packet is used as a unit of retransmission performed through ARQ in the present embodiment, the unit may be a transmission unit included in a packet or may be a data unit. For example, when the mobile station UE transmits one uplink packet D(N) to the source base station eNB1, the mobile station UE disassembles the packet into a plurality of parts and transmits each part to the source base station eNB1. In this case, there are some occasions when some of the parts are successfully received by the source base station eNB1 while the other parts result in error. Accordingly, the source base station eNB1 notifies the target base station eNB2 of information specifying the parts in error, and the target base station eNB2 sends a request for retransmission to the mobile station UE, whereby only the parts in error can be reversely transferred from the target base station eNB2 to the source base station eNB1. Since the parts in error only are retransmitted, the amount of data transfer between the base stations can be further reduced.

13. Sixth Example 13.1) Network Architecture

Figure 24:
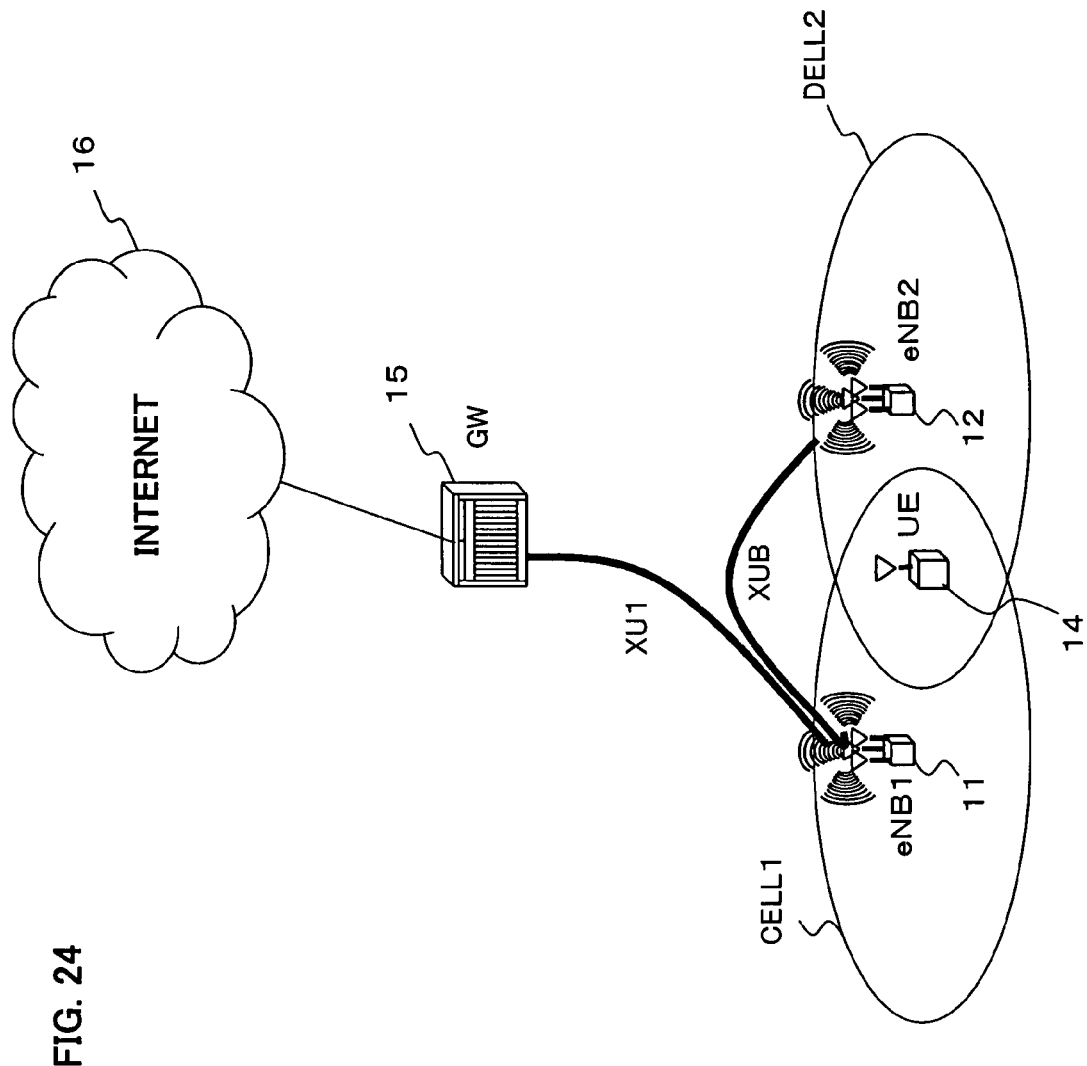
FIG. 24 is a diagram schematically showing a network architecture III of a mobile communications system.

FIG. 24 is a diagram schematically showing a network architecture III of a mobile communications system. Here, to simplify the description, it is assumed that two base stations 11 and 12 (eNB1 and eNB2, respectively) are physically connected to each other, that the base station eNB1 is physically connected to a gateway 15 (GW), and that the base station eNB2 is not physically connected to the gateway 15 (GW) but is logically connected thereto through the base station eNB1. Moreover, it is assumed that a mobile station 14 (UE) moves with the base stations eNB1 and eNB2 as its source base station and target base station, respectively.

The base station eNB2 is set so as to be connected only to the adjacent base station eNB1 as described above, whereby it is possible to expand the service area while suppressing the spending on new equipment. This is particularly suitable for a setting in an area where the amount of communication is small. A sixth example of the present invention is an application of the fourth exemplary embodiment of the present invention to the above-described network architecture III.

13.2) Protocol Control

The protocols used in the sixth example, related to the retransmission and reverse transfer control, are HARQ and ARQ, which are the same as those used in the first example, and therefore the description thereof will be omitted.

13.3) Uplink Data Transmission

First, it is assumed that there are incompletely received packets among uplink packets transmitted from the mobile station UE, and that a handover is decided in the state where these uplink packets are held by the source base station eNB1.

The source base station eNB1 notifies the target base station eNB2 of information required for retransmission of the packets corresponding to the incompletely received packets, for example a reception status report. When the mobile station UE has made a cell change to the target base station eNB2, the target base station eNB2 presents a request for retransmission to the mobile station UE by using the information notified from the source base station eNB1. In response to this, the mobile station UE preferentially transmits the retransmission packets.

When completely receiving the retransmission packets from the mobile station UE, the target base station eNB2 transfers these retransmission packets to the source base station eNB1. The source base station eNB1 carries out an ARQ process by using the retransmission packets and then transmits a series of the completely received packets to the gateway GW.

When the target base station eNB2 has completely transferred all the retransmission packets to the source base station eNB1, the target base station eNB2 requests the gateway GW to switch the path. The source base station eNB1 terminates its own ARQ process if there are no more packets in the mobile station UE to transmit to the source base station eNB1.

The target base station eNB2 becomes the serving base station (SBTS) of the mobile station UE and sends the mobile station UE a request to resume uplink transmission, whereby the mobile station UE starts transmitting new packets to the target base station eNB2. When the target base station eNB2 has completely received several uplink data packets from the mobile station UE, the target base station eNB2 transmits them to the gateway GW via the source base station 11.

In this manner, the uplink packets held by the source base station eNB1 are transmitted to the gateway GW from the source base station eNB1, and the uplink packets newly received by the target base station eNB2 from the mobile station UE are transmitted to the gateway GW from the target base station eNB2 through a logical channel via the source base station eNB1.

13.4) Effects

As described above, according to the sixth example of the present invention, retransmission packets are reversely transferred from the target base station eNB2 to the source base station eNB1, and then packets, as a series of completely received packets, are transmitted from the source base station eNB1 to the gateway GW. Moreover, a series of new uplink packets are transmitted from the target base station eNB2 to the gateway GW similarly via the source base station eNB1. Therefore, even with the network architecture III in which the target base station eNB2 is physically connected only to the source base station eNB1, an uplink packet can be transmitted at the time of handover. Accordingly, it is also possible to flexibly adapt to a change in the architecture.

14. Seventh Example 14.1) Network Architecture

Figure 25:
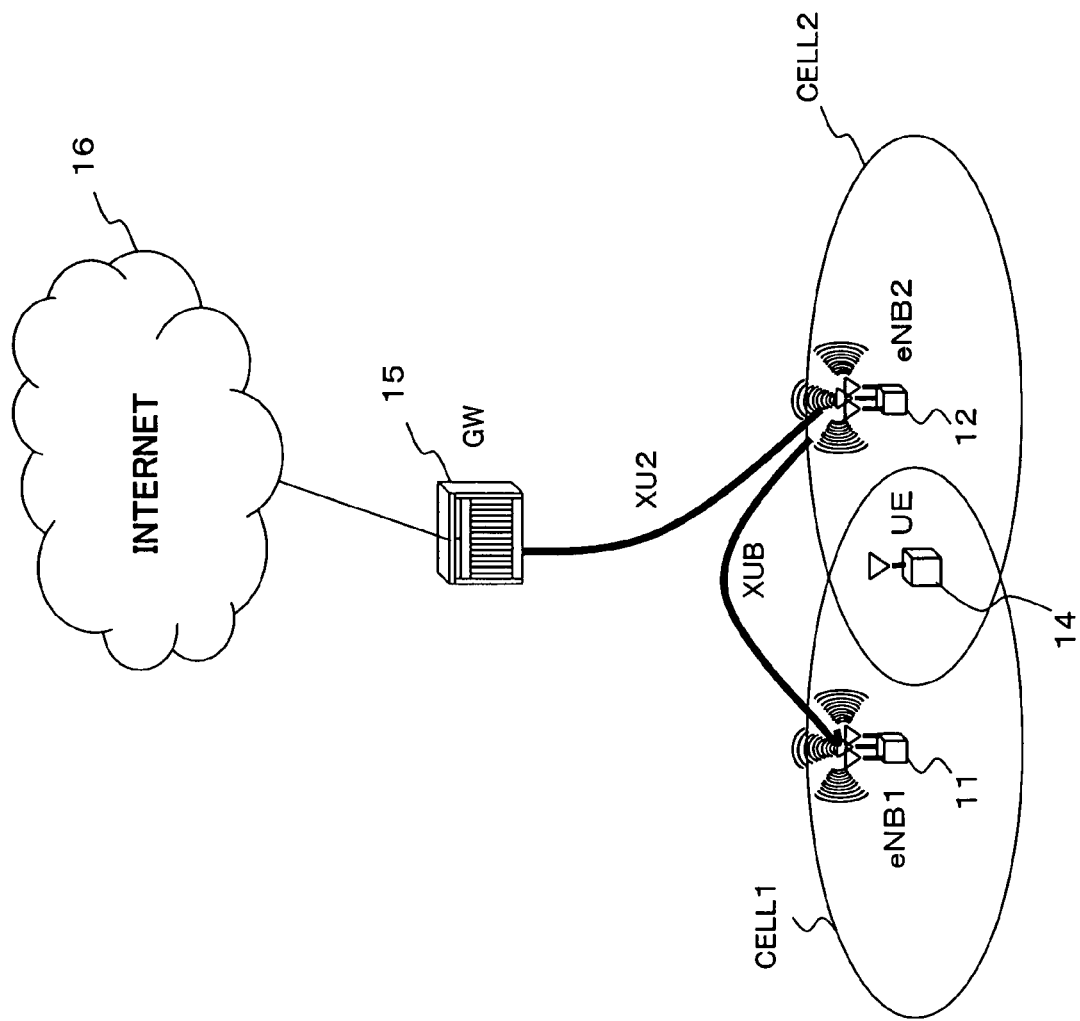
FIG. 25 is a diagram schematically showing a network architecture IV of a mobile communications system.

FIG. 25 is a diagram schematically showing a network architecture IV of a mobile communications system. Here, to simplify the description, it is assumed that two base stations 11 and 12 (eNB1 and eNB2, respectively) are physically connected to each other, that the base station eNB2 is physically connected to a gateway 15 (GW), and that the base station eNB1 is not physically connected to the gateway 15 (GW) but is logically connected thereto through the base station eNB2. Moreover, it is assumed that a mobile station 14 (UE) moves with the base stations eNB1 and eNB2 as its source base station and target base station, respectively.

The base station eNB1 is set so as to be connected only to the adjacent base station eNB2 as described above, whereby it is possible to expand the service area while suppressing the spending on new equipment. This is particularly suitable for a setting in an area where the amount of communication is small. A seventh example of the present invention is an application of the fifth exemplary embodiment of the present invention to the network architecture III shown in FIG. 24 and the network architecture IV shown in FIG. 25.

14.2) Protocol Control

The protocols used in the seventh example of the present invention, related to the retransmission and reverse transfer control, are HARQ and ARQ, which are the same as those used in the first example, and therefore the description thereof will be omitted.

14.3) Uplink Data Transmission

According to the present embodiment, the data transfer controls are switched depending on whether the control is applied to the network architecture III shown in FIG. 24 or similar one, or whether the control is applied to the network architecture IV shown in FIG. 25 or similar one. Specifically, if the control is applied to the network architecture III shown in FIG. 24 or similar one, the data transmission procedure described in the sixth example is adopted. If the control is applied to the network architecture IV shown in FIG. 25 or similar one, the forward transfer procedure described in the section 10.3 of the third example is adopted.

14.4) Effects

As described above, depending on the network architecture, it is determined whether to perform the forward transfer or to perform the reverse transfer of a retransmission packet from the target base station eNB2 to the source base station eNB1. Thus, it is possible to flexibly adapt to various architectures.

15. Various Exemplary Aspects of the Present Invention

The present invention can be applied to general mobile communications systems having an interface between base stations.

As described before, an object of the present invention is to provide a novel data transmission method and system that can reduce the amount of data transferred between base stations. From another aspect of the present invention, an object of the present invention is to provide a mobile communications system that can reduce the duration of a communication interruption at the time of handover, as well as a data transmission method for the system. From still another aspect, an object of the present invention is to provide a mobile communications system that can be easily adapted to a change in system architecture, as well as a data transmission method for the system.

According to a first exemplary embodiment, a first base station performs retransmission control using a retransmitted data unit and, after having completed the retransmission control in the first base station, a second base station performs retransmission control for new data received from a mobile station.

According to a second exemplary embodiment, the first base station performs retransmission control using a retransmitted data unit and, in parallel with the retransmission control performed by the first base station, the second base station performs retransmission control for new data received from a mobile station.

A data transmission system according to the present invention is characterized by including: a first control means for performing retransmission control for data received from a mobile station at the first base station which is a handover source base station; and a second control means for receiving a data unit to be retransmitted according to the retransmission control, from the mobile station and transmitting it to the first base station at the second base station which is a handover target base station.

According to the present invention, data corresponding to incompletely received data at a source base station is retransmitted by the mobile station to a target base station and then the retransmitted data received by the target base station is reversely transmitted to the source base station. Such a reverse transfer control eliminates the need of transferring all received data at the time of handover from the source base station to the target base station, resulting in the reduced amount of traffic between base stations and a reduction in the duration of a communication interruption.

In addition, an automatic repeat request process is set between a mobile station and each of the source base station and the target base station, whereby the mobile station can transmit new uplink packets to the target base station in parallel with the retransmission of packets by the source base station. Accordingly, the duration of a communication interruption can be further reduced.

The present invention can be applied to any system in which a data unit to be received in the ARQ control may contain an error.

The present invention may be embodied in other specific forms without departing from the spirit or essential characteristics thereof. The above-described exemplary embodiments and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for transmitting data when handover of communication with a mobile station occurs from a first base station to a second base station in a mobile communications system, comprising:
   a) receiving a plurality of data packets from the mobile station at the first base station;
   b) determining one or more of the data packets received at the first base station for retransmission;
   c) notifying the mobile station to retransmit said one or more data packets to the second base station;
   d) the mobile station retransmitting said one or more data packets to the second base station; and
   e) reversely transmitting the one or more data packets from the second base station to the first base station;
   wherein:
   the first base station performs retransmission control using the one or more data packets received from the second base station; and
   in parallel with retransmission control performed by the first base station, the second base station performs retransmission control for data received from the mobile station.

2. A method for transmitting data when handover of communication with a mobile station occurs from a first base station to a second base station in a mobile communications system, comprising:
   a) receiving a plurality of data packets from the mobile station at the first base station;
   b) determining one or more of the data packets received at the first base station for retransmission;
   c) notifying the mobile station to retransmit said one or more data packets to the second base station;
   d) the mobile station retransmitting said one or more data packets to the second base station; and
   e) reversely transmitting the one or more data packets from the second base station to the first base station;
   wherein c) notifying the mobile station to retransmit said one or more data packets to the second base station, and
   e) reversely transmitting the one or more data packets from the second base station to the first base station, are performed when an amount of data packets to be retransmitted with respect to data received from the mobile station is smaller than a predetermined threshold value.

3. A system for transmitting data when handover of communication with a mobile station occurs from a first base station to a second base station in a mobile communications system, wherein:
   the first base station is configured to receive a plurality of data packets from the mobile station, determine if one or more received data packets are incomplete, and request the mobile station to retransmit said one or more data packets which are determined to be incomplete and
   the second base station is configured to receive said one or more data packets from the mobile station and reversely transmit the one or more data packets to the first base station;
   wherein:
   the first base station is configured to perform retransmission control using the data received from the second base station; and
   the second base station is configured to perform retransmission control for data received from the mobile station in parallel with the retransmission control performed by the first base station.

4. A system for transmitting data when handover of communication with a mobile station occurs from a first base station to a second base station in a mobile communications system, wherein:
   the first base station is configured to receive a plurality of data packets from the mobile station, determine if one or more received data packets are incomplete, and request the mobile station to retransmit said one or more data packets which are determined to be incomplete and
   the second base station is configured to receive said one or more data packets from the mobile station and reversely transmit the one or inure data packets to the first base station;
   wherein the second base station is configured to perform reverse transmission and the first base station is configured to receive said one or more data packets from the second base station to complete retransmission control, when an amount of data packets to be retransmitted with respect to data received from the mobile station is smaller than a predetermined threshold value.

* * * * *

UNITED STATES PATENT AND TRADEMARK OFFICE
CERTIFICATE OF CORRECTION

| | | |
|---|---|---|
| PATENT NO. | : 8,781,470 B2 | Page 1 of 1 |
| APPLICATION NO. | : 11/808301 | |
| DATED | : July 15, 2014 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1756 days.

Signed and Sealed this
Fifth Day of January, 2016

Michelle K. Lee
*Director of the United States Patent and Trademark Office*